United States Patent
Bose

(10) Patent No.: US 12,220,744 B2
(45) Date of Patent: Feb. 11, 2025

(54) METHODS AND COMPOSITIONS FOR THE PREPARATION OF POWDERS FOR BINDER-BASED THREE-DIMENSIONAL ADDITIVE METAL MANUFACTURING

(71) Applicant: Desktop Metal, Inc., Burlington, MA (US)

(72) Inventor: Animesh Bose, Burlington, MA (US)

(73) Assignee: Desktop Metal, Inc., Burlington, MA (US)

( * ) Notice: Subject to any disclaimer, the term of this patent is extended or adjusted under 35 U.S.C. 154(b) by 733 days.

(21) Appl. No.: 17/254,805

(22) PCT Filed: Jun. 20, 2019

(86) PCT No.: PCT/US2019/038096
§ 371 (c)(1),
(2) Date: Dec. 21, 2020

(87) PCT Pub. No.: WO2019/246321
PCT Pub. Date: Dec. 26, 2019

(65) Prior Publication Data
US 2021/0260652 A1    Aug. 26, 2021

Related U.S. Application Data

(60) Provisional application No. 62/687,438, filed on Jun. 20, 2018.

(51) Int. Cl.
*B33Y 70/10* (2020.01)
*B22F 1/065* (2022.01)
(Continued)

(52) U.S. Cl.
CPC ............. *B22F 10/62* (2021.01); *B22F 1/065* (2022.01); *B22F 1/148* (2022.01); *B22F 1/17* (2022.01);
(Continued)

(58) Field of Classification Search
CPC ...... B22F 1/148; B22F 1/065; B22F 2304/10; B33Y 70/10
See application file for complete search history.

(56) References Cited

U.S. PATENT DOCUMENTS

| | | | |
|---|---|---|---|
| 2002/0068005 A1* | 6/2002 | Meinhardt | H01L 21/4807 75/255 |
| 2003/0000340 A1* | 1/2003 | Mende | B22F 9/24 75/371 |

(Continued)

FOREIGN PATENT DOCUMENTS

WO    WO-2019045733 A1 *    3/2019    ............ B22F 1/0018

*Primary Examiner* — Adam Krupicka
(74) *Attorney, Agent, or Firm* — Ethod Legal, PLLC; Jonathan D. Hall

(57) ABSTRACT

Devices, systems, and methods are directed to coated powder for three dimensional additive manufacturing. The powder may include a first material coated with a second material, with the coating advantageously resisting segregation of the first material and the second material during handling processes associated with fabrication. The reduced segregation of the first material and the second material may facilitate forming finished three-dimensional parts with improved homogeneity of microstructures and, thus, improved physicochemical properties. More generally, the reduced segregation of the first material and the second material achievable through coating the first material with the second material may facilitate binder jet fabrication using a wider array of combinations of first material and second material as compared to binder jet fabrication using mixtures of constituent powders of the first material and the second material.

16 Claims, 10 Drawing Sheets

(51) Int. Cl.
  *B22F 1/148* (2022.01)
  *B22F 1/17* (2022.01)
  *B22F 1/18* (2022.01)
  *B22F 10/14* (2021.01)
  *B22F 10/16* (2021.01)
  *B22F 10/62* (2021.01)
  *B33Y 10/00* (2015.01)
  *B33Y 30/00* (2015.01)
  *B33Y 80/00* (2015.01)

(52) U.S. Cl.
  CPC ............... *B22F 1/18* (2022.01); *B22F 10/14* (2021.01); *B22F 10/16* (2021.01); *B33Y 10/00* (2014.12); *B33Y 30/00* (2014.12); *B33Y 70/10* (2020.01); *B33Y 80/00* (2014.12); *B22F 2301/052* (2013.01); *B22F 2301/15* (2013.01); *B22F 2301/35* (2013.01); *B22F 2304/10* (2013.01)

(56) References Cited

U.S. PATENT DOCUMENTS

| | | | |
|---|---|---|---|
| 2017/0008082 A1* | 1/2017 | Chen | B22F 1/05 |
| 2019/0060993 A1* | 2/2019 | Bose | B33Y 40/20 |
| 2019/0060994 A1* | 2/2019 | Bose | B33Y 70/00 |
| 2021/0331237 A1* | 10/2021 | Bose | B33Y 80/00 |

\* cited by examiner

METHODS AND COMPOSITIONS FOR THE PREPARATION OF POWDERS FOR BINDER-BASED THREE-DIMENSIONAL ADDITIVE METAL MANUFACTURING

CROSS-REFERENCE TO RELATED PATENT APPLICATION

This patent application claims a benefit to the Jun. 20, 2018 filing date of U.S. provisional patent application Ser. No. 62/687,438, titled "Coated Powder for Binder Jetting in Additive Metal Manufacturing." The disclosure of U.S. 62/687,438 is incorporated by reference herein in its entirety.

BACKGROUND

Binder jetting is an additive manufacturing technique that uses a liquid binder to join particles of a powder to form a three-dimensional object. In particular, a controlled pattern of the liquid binder is applied to successive layers of the powder such that the layers adhere to form a three-dimensional green part. Through subsequent processing, the three-dimensional green part can be formed into a finished three-dimensional part.

Generally, the powder used to form a three-dimensional object through binder jetting includes two or more constituent powders mixed together to form a substantially homogenous blended powder. However, during handling steps, the blended powder can become increasingly inhomogeneous as the constituent powders tend to separate. For example, the constituent powders tend to separate as a result of density differences or particle size differences.

A finished three-dimensional part formed from segregated powder may exhibit inhomogeneous microstructures. In turn, such inhomogeneous microstructures can result in inconsistent properties within the finished part, often resulting in a poor-quality part. Further, the degree and nature of the segregation of the constituents in a blended powder can vary significantly from part to part, making quality control of multiple instances of finished three-dimensional parts difficult. Accordingly, there remains a need for powders, useful in binder jetting additive manufacturing, for forming finished three-dimensional parts having a wide array of compositions while having consistent properties.

SUMMARY

Devices, systems, and methods are directed to coated powder for binder jetting in additive manufacturing. The powder may include a first material coated with a second material, with the coating advantageously resisting segregation of the first material and the second material during handling processes associated with binder jetting fabrication. The reduced segregation of the first material and the second material may facilitate forming finished three-dimensional parts with improved homogeneity of microstructures and, thus, improved physicochemical properties. More generally, the reduced segregation of the first material and the second material achievable through coating the first material with the second material may facilitate binder jet fabrication using a wider array of combinations of the first material and the second material as compared to binder jet fabrication using mixtures of constituent powders of the first material and the second material.

In one embodiment, dispersible power for three-dimensional additive metal manufacturing has a plurality of granules. Each granule includes a dispersion of fine or ultra-fine first metallic particles agglomerated in a binder matrix.

In a second embodiment, a binder jetting system for three-dimensional additive metal manufacturing includes a powder supply configured to receive a dispersible power for three-dimensional additive metal manufacturing. The powder contains a plurality of granules where each granule includes a dispersion of fine or ultra-fine first metallic particles agglomerated in a binder matrix. The system also includes a powder bed, a spreader configured to transfer the powder from the powder supply to the powder bed and a printhead moveable relative to the powder bed.

In a third embodiment, a dispersible power for three-dimensional additive metal manufacturing has a plurality of granules. Each granule includes a core of a first material overlaid with a coating of a second material wherein the first material is different from the second material.

In a fourth embodiment, a binder jetting system for three-dimensional additive metal manufacturing has a powder supply configured to receive a dispersible power for three-dimensional additive metal manufacturing. The powder contains a plurality of granules. Each granule has a core of a first material overlaid with a coating of a second material wherein the first material is different from the second material. The system further includes a powder bed, a spreader configured to transfer the powder from the powder supply to the powder bed and a printhead moveable relative to the powder bed.

In a fifth embodiment, a porous skeletal structure is formed by three dimensional additive manufacturing. This structure has a plurality of granules. Each granule has a core formed from a glass or a ceramic and a sinterable metallic coating overlaying the glass or ceramic core. The sinterable metallic coating fuses adjacent granules together.

In a sixth embodiment, a method for the manufacture of a shaped product by three dimensional additive manufacturing includes shaping a plurality of glass or ceramic spheres into a desired shape, fusing adjacent spheres to form a porous skeletal structure and infiltrating the pores of the porous skeletal structure with a infiltrating metal.

In a seventh embodiment, the method includes sintering a granule that has a core formed from glass or a ceramic and a sinterable metallic coating overlying the core by heating to a temperature where the metallic coating forms a liquid phase resulting in full densification.

BRIEF DESCRIPTION OF THE DRAWINGS

The systems and methods described herein are set forth in the appended claims. However, for the purpose of explanation, several implementations are set forth in the following drawings:

DESCRIPTION

Embodiments will now be described with reference to the accompanying figures. The foregoing may, however, be embodied in many different forms and should not be construed as limited to the illustrated embodiments set forth herein.

Figure 1A:
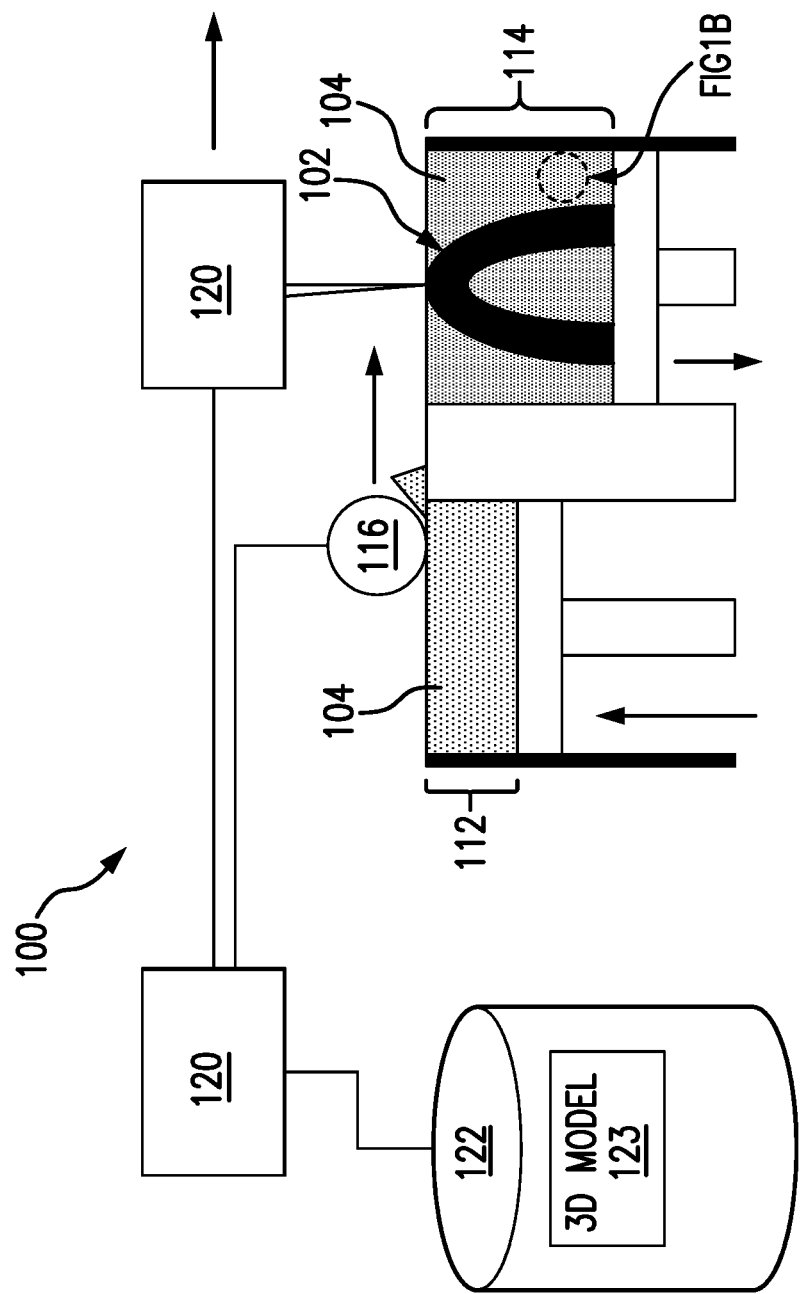
FIG. 1A is a schematic representation of an additive manufacturing system for forming a three-dimensional object.
Figure 1B:
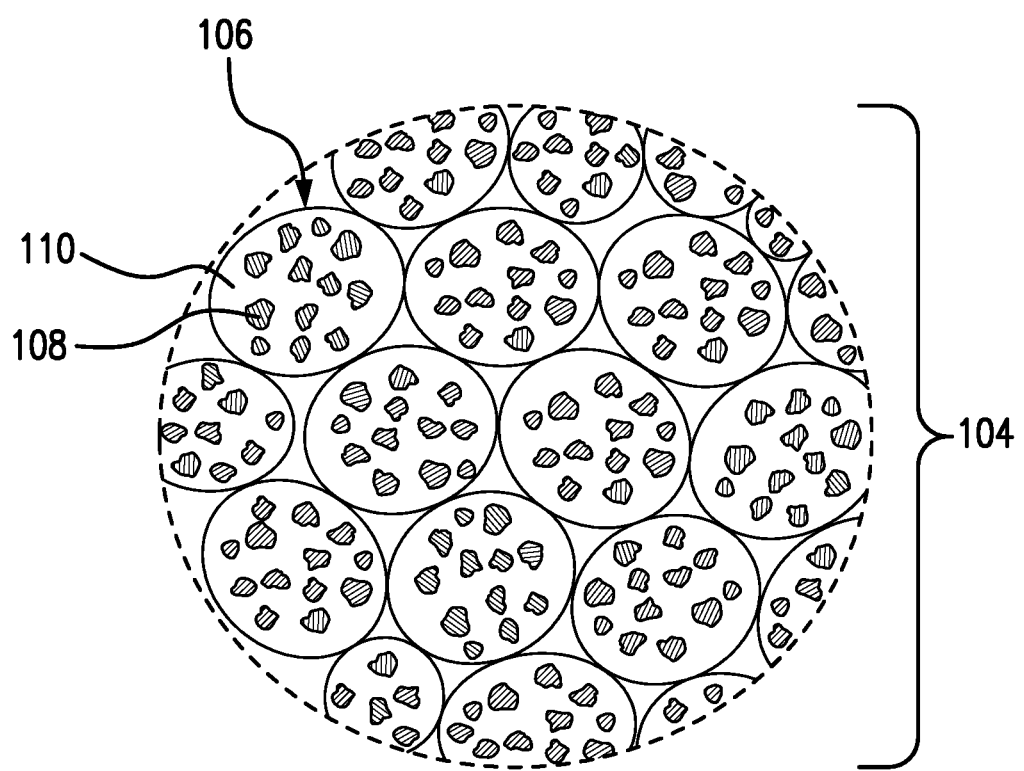
FIG. 1B is an enlarged view of a powder useable with the additive manufacturing system of FIG. 1A to form a three-dimensional object, the powder including granules.

Referring to FIGS. 1A and 1B, an additive manufacturing system 100 can be used to form a three-dimensional object 102 from a powder 104. As described below, the powder 104 can include granules 106. Each granule 106 can include an agglomeration of first metallic particles 108 dispersed in a binder matrix. As discussed below, the binder matrix may be a first binder component in a multi-binder system. The granules 106 of the powder 104 can be spread into a plurality of sequential layers and, in each layer, the granules 106 can be reflowed along a respective predetermined two-dimensional pattern. The binder matrix 110 in the reflowed granules 106 along the respective two-dimensional pattern in each layer can bind the first metallic particles 108 to one another and to one or more adjacent layers to form the three-dimensional object 102. The three-dimensional object 102 is a green part that, as described below, can be subsequently processed (e.g., sintered) to form a finished part.

In general, the granules 106 can facilitate overcoming significant constraints associated with three-dimensional fabrication techniques that are based on spreading a powder and jetting a binder (e.g., binder jetting). For example, the granules 106 can be coarse enough to be adequately spread in each layer while the first metallic particles 108 agglomerated in the granules 106 can be fine enough to be sintered into a high-density finished part. Thus, the granules 106 can facilitate fabricating the three-dimensional object 102 from the first metallic particles 108 having a size range that, without agglomeration, is not suitable for spreading. Further, or instead, agglomeration of the first metallic particles 108 in the granules 106 can reduce risks (e.g., pyrophoric risk) associated with ultrafine particles that are not agglomerated. Additionally, or alternatively, as compared to a system in which a binder is delivered to a powder bed exclusively from a printhead, the inclusion of a first binder component via binder matrix 110 can reduce, or eliminate, the amount of a second binder component required to be delivered from a printhead. Reduction or elimination of the amount of binder required to be delivered from the printhead can reduce downtime associated with repair, maintenance, and replacement of the printhead. The result, therefore, of the use of granules 106 to deliver the first binder component of the binder matrix 110 can be increased throughput of three-dimensional objects.

The additive manufacturing system 100 can include a powder supply 112, a powder bed 114, a spreader 116, and a printhead 118. The spreader 116 can be movable from the powder supply 112 to the powder bed 114 and along the powder bed 114 to spread successive layers of the powder 104 across the powder bed 114. The printhead 118 can be movable (e.g., in coordination with movement of the spreader 106) across the powder bed 104, and the printhead 108 can include one or more orifices through which a liquid can be delivered from the printhead 108 to each layer of the powder 104 along the powder bed 114. As described below, the liquid can interact with the at least one component 110 of the binder system in the granules 106 to reflow the granules 106 along a respective predetermined two-dimensional pattern in each layer.

The spreader 116 can include, for example, a roller rotatable about an axis perpendicular to an axis of movement of the spreader 116 across the powder bed 114. The roller can be, for example, substantially cylindrical. In use, rotation of the roller about the axis perpendicular to the axis of movement of the spreader 116 can spread the powder 104 from the powder supply 112 to the powder bed 114 and form a layer of the powder 104 along the powder bed 114. It should be appreciated, therefore, that the plurality of sequential layers of the powder 104 can be formed in the powder bed 114 through repeated movement of the spreader 116 across the powder bed 114.

The printhead 118 can define one or more orifices directed toward the powder bed 114 as the printhead 118 moves across the powder bed 114. The printhead 118 can include one or more piezoelectric elements. Each piezoelectric element can be associated with a respective orifice and, in use, each piezoelectric element can be selectively actuated such that displacement of the piezoelectric element can expel liquid from the respective orifice. In certain implementations, the printhead 118 can expel a single liquid formulation from the one or more orifices. In some implementations, however, the printhead 118 can expel a plurality of liquid formulations from the one or more orifices. For example, the printhead 118 can expel a plurality of solvents, a plurality of components of a binder system, or both from the one or more orifices.

In general, the printhead 118 can be controlled to deliver liquid to the powder bed 118 in predetermined two-dimensional patterns, with each pattern corresponding to a respective layer of the three-dimensional object 102. In certain implementations, the printhead 118 can extend axially along substantially an entire dimension of the powder bed 118 in a direction perpendicular to a direction of movement of the printhead 118 across the powder bed 114. For example, in such implementations, the printhead 118 can define a plurality of orifices arranged along the axial extent of the printhead 118, and liquid can be selectively jetted from these orifices along the axial extent to form a predetermined two-dimensional pattern of liquid along the powder bed 114 as the printhead 118 moves across the powder bed 114. Additionally, or alternatively, the printhead 118 can extend axially along less than an entire dimension of the powder bed 114 in a direction perpendicular to a direction of movement of the printhead 118 across the powder bed 114. In such implementations, the printhead 118 can be movable in two dimensions relative to a plane defined by the powder bed 114 to deliver a predetermined two-dimensional pattern of a liquid along the powder bed 114.

The additive manufacturing system 100 can further include a controller 120 in electrical communication with the powder supply 112, the powder bed 114, the spreader 116, and the printhead 118. The additive manufacturing system 100 can still further include a non-transitory, computer readable storage medium 122 in communication with the controller 110 and having stored thereon a three-dimensional model 124 and instructions for carrying out any one or more of the methods described herein. In use, one or more processors of the controller 120 can execute instructions to control z-axis movement of one or more of the powder supply 112 and the powder bed 114 relative to one another as the three-dimensional object 102 is being formed. For example, one or more processors of the controller 120 can execute instructions to move the powder supply 112 in a z-axis direction toward the spreader 116 to direct the powder 104 toward the spreader 116 as each layer of the three-dimensional object 102 is formed and to move the powder bed 114 in a z-axis direction away from the spreader 116 to accept each new layer of the powder 104 along the top of the powder bed 114 as the spreader 116 moves across the powder bed 114. Additionally, or alternatively, one or more processors of the controller 120 can control movement of the spreader 116 from the powder supply 112 to the powder bed 114 to move successive layers of the powder 104 across the powder bed 114.

Further, or instead, one or more processors of the controller 120 can control movement of the printhead 118 and delivery of liquid from the printhead 118 to deliver a respective predetermined two-dimensional pattern of the liquid to each new layer of the powder 104 along the top of the powder bed 114. In general, as a plurality of sequential layers of the powder 104 are introduced to the powder bed 114 and the predetermined two-dimensional patterns of the liquid are delivered to each respective layer of the plurality of sequential layers of the powder 104, the three-dimensional object 102 is formed according to the three-dimensional model 124 stored in the non-transitory, computer readable storage medium 122. In certain implementations, the controller 120 can retrieve the three-dimensional model 124 in response to user input, and generate machine-ready instructions for execution by the additive manufacturing system 100 to fabricate the three-dimensional object 102.

In general, the granules 106 can be discrete and flowable relative to one another to form the plurality of sequential layers of the powder 104. As used herein, unless otherwise specified or made clear from the context, flowable shall be understood to be used in the broadest sense to refer to whether or not the granules 106 move relative to one another. Thus, the flowability of the granules 106 can be a function of variables related to the granules 106, including, by way of example, any one or more of the size, size distribution, shape, surface area, density, and material of the granules 106.

In certain implementations, the granules 106 can be flowable relative to one another to form layers dimensioned to address countervailing considerations associated with accurately controlling dimensions of the three-dimensional object 102 and rapidly forming the three-dimensional object. For example, the granules 106 can be flowable relative to one another to form a layer having a thickness greater than about 30 microns and less than about 70 microns (e.g., about 50 microns).

In certain implementations, the granules 106 can be substantially spherical. As used herein, a substantially spherical granule shall be understood to a granule having a volume that is within +30 percent of a volume of a sphere defined by a maximum dimension of the respective granule. Additionally, or alternatively, the granules 106 can be formed through a spray drying process, and the granules 106 can be spherical to within manufacturing tolerances associated with such a process.

The granules 106 can have an average particle size of greater than about 20 microns and less than about 100 microns. The average particle size is determined by measuring the particle sizes of the powder by a known method, such as laser light scattering from dispersed particles, sedimentation for coarser particles, sieving. The particle size distribution is typically reported as D10, D50 and D90. These values are extracted from cumulative percent (amount of powder smaller than) versus particle size. The curves are generally like an "S". From the curve, D10, D50, and D90 correspond to the particle sizes as 10, 50, and 90% on the cumulative distribution. The particle size corresponding to 50% in the cumulative distribution curve is referred to as the average particle size.

The size of the granules 106 can be a function of, for example, the size and number of the first metallic particles 108 and the amount of first binder component in the binder matrix 110 for each granule. In certain implementations, as described in greater detail below, metallic particles and additional components of the binder system can be added to the powder bed 114 apart from the granules 106. In turn, the size of the granules 106 can be a function of such separately added metallic particles and/or volume of first binder component. For example, under otherwise comparable conditions, the size of the granules 106 can be smaller in implementations in which a higher fraction of the overall binder system is delivered from the printhead to the powder bed 114.

The first metallic particles 108 have an average particle size less than an average particle size of the granules 106, with the granules 106 generally acting as a carrier for spreading the first metallic particles 108 and, in certain instances, reducing certain safety risks associated with small particles. In certain implementations, the first metallic particles 108 can have an average particle size and a particle size distribution that is suitable for sintering to form a dense final part from the three-dimensional object 102. As a more specific example, the first metallic particles 108 can have an average particle size of greater than about 1 micron and less than about 5 microns. While such a size range can be useful in certain implementations, it should be appreciated that the first metallic particles 108 can have a smaller average particle size, such as, for example, an average particle size in a submicron range, such as a nanoparticle range (e.g., an average particle size greater than about 1 nanometer and less than about 100 nanometers).

In certain implementations, the first metallic particles 108 can be a single material. For example, the first metallic particles 108 can be an elemental powder such as tungsten, copper, nickel, cobalt, and iron. Alternatively, the first metallic particles 108 can be a single alloy (e.g., 316L stainless steel, 17-4 PH stainless steel, Co—Cr—Mo powder, or F15 powder—a nickel-cobalt-iron alloy). Additionally, or alternatively, the single material of the first metallic particles 108 can have an average particle size of greater than about 1 micron and less than about 5 microns. As used herein, a single material shall be understood to allow for impurities at levels associated with powder handling of metals and, further or instead, to allow for impurities in predetermined amounts of impurities specified for the three-dimensional object 102.

In other implementations, the first metallic particles 108 can include a plurality of materials. For example, the ratio of the plurality of materials in the first metallic particles 108 can be in a predetermined ratio suitable for alloying with one another to achieve a target alloy composition in the three-dimensional object 102. As an additional or alternative example, the first metallic particles 108 can include material components of stainless steel. As a more specific example, the first metallic particles 108 can include two or more of tungsten, copper, nickel, cobalt, and iron.

In implementations where the first metallic particles 108 include a plurality of materials, the first metallic particles 108 can alloy to form a different material. For example, the first metallic particles 108 can include tungsten carbide having a submicron average particle size and cobalt having an average particle size of about 1 micron. These particles can be sintered to form a tungsten-carbide-cobalt based hard metal. As an example of such a tungsten-carbide-cobalt based hard metal, the first metallic particles 108 can include fine stainless steel and tungsten carbide and cobalt such that sintering the three-dimensional object 102 including these materials can form unique microstructures in a stainless-steel matrix. More specifically, these unique microstructures can be areas of tungsten carbide-cobalt in a stainless-steel matrix, with these areas having high hardness that can advantageously improve wear resistance of the finished part, as compared to the wear resistance of the finished part without such areas of high hardness.

Alternatively, the first metallic particles 108 can include materials that do not alloy with one another (e.g., tungsten and copper or molybdenum and copper). Additionally, or alternatively, the plurality of materials in the first metallic particles 108 can have different average particle sizes, with one of the materials being much finer than another one or more of the materials. Because sintering temperature is a function of the particle size, differences in the sizes of the different materials included the first metallic particles 108 can be useful for achieving sintering at a target temperature.

In some implementations, the first metallic particles 108 can be lightly sintered to one another in the granules 106. Such light sintering can be useful, for example, for reducing the likelihood of crushing the granules 106 as the powder 104 is spread across the powder bed 114. Such resistance to crushing can be useful, for example, for achieving a desired distribution of the first metallic particles 108 in the powder bed 114. While the granules 106 can be formed to resist crushing in certain implementations, it should be appreciated that the granules 106 can be additionally or alternatively formed to resist breaking up as the granules 106 are flowed in the powder 104 and to break up as the granules 106 are spread across the powder bed 114 by the spreader 116.

The binder matrix 110 can be initially solid to facilitate spreading the granules 106 across the powder bed 114 in sequential layers. Along a given layer, the granules 106 can be reflowed such that the binder matrix 110 moves along the layer and, alone or in combination with one or more other components of the binder system, adheres to one or more adjacent layers of the three-dimensional object 102 being formed in the powder bed 114. As used herein, reflowing of the granules 106 shall be understood to include any one or more of various different processes for increasing the flow of the first binder component of the binder matrix 110 (e.g., changing the first binder component from a substantially solid state to a substantially liquid state). As described in greater detail below, reflowing the first binder component can be based on a chemical process. As also described in greater detail below, reflowing the first binder component can additionally or alternatively be based on a thermal process.

In certain implementations, the first binder component can be soluble in a solvent that may be one or more of water, hexane, alcohol, and limonene to reflow the first bonder component of the binder matrix 110. In certain implementations, the solvent alone can be jetted from the printhead 118 toward the powder bed 114 to reflow the granules 106 along a respective predetermined two-dimensional pattern in each layer. Additionally, or alternatively, a mixture of the solvent and a second component of the binder system can be jetted from the printhead 118 to reflow the granules 106 along a respective predetermined two-dimensional pattern in each layer. For example, the liquid jetted from the printhead 118 to reflow the granules 106 can include the solvent and the same binder as the binder matrix 110 such that the liquid jetted from the printhead 118 supplements the amount of first binder component already present in the granules 106 in the powder bed 114. Further or instead, the binder system can be a multi-component system, and the liquid jetted from the printhead 118 to reflow the granules 106 can include a second binder component that differs in composition from the first binder component. Continuing with this example, the combination of the first binder component already present in the granules in the powder bed 114 can reflow and become activated as a binder through exposure to the liquid jetted from the printhead 118.

The use of the first binder component 110 of the binder matrix 110 to agglomerate the first metallic particles 108 in the granules 106 can have significant advantages with respect to the printhead 118. For example, because at least a portion of the binder system is already present in the granules 106 in the powder bed 114, less of the binder system is required to be delivered through the printhead 118. As a more specific example, in instances in which a target volume fraction of the binder system in the three-dimensional object 102 is 33 percent by volume, about half of the volume fraction of the binder system can be introduced into the three-dimensional object 102 through reflowing the granules 106. Continuing with this example, the remainder of the volume fraction of the binder system can be introduced into the three-dimensional object through liquid jetted from the printhead 118. Additionally, or alternatively, in instances in which the binder system includes multiple components, the printhead 118 can be used to jet more easily handled components of the binder system. Thus, in general, bifurcation of the binder system between the granules 106 and a liquid jetted by the printhead 118 can, usefully extend the life of the printhead 118 and/or reduce maintenance requirements associated with the printhead 118.

The composition of the first binder component of the binder matrix 110 in the granules 106 can be selected based one or more factors. For example, the material of the first binder component can be selected for enhancing stability in storage and/or transport of the granules 106. Additionally, or alternatively, the composition of the first binder component can be selected for safety with respect to handling the granules 106. Further, or instead, the composition of the first binder component can be selected based on compatibility with a process (e.g., spray drying) used to form the granules 106. Still further or instead, the composition of the first binder component can be selected based on compatibility with the first metallic particles 108. As an example of such compatibility, the first binder component can have a melt temperature less than a melt temperature of the first metallic particles 108 such that the first metallic particles 108 can remain solid over a range of temperatures in which the binder matrix 110 is melted. It should be appreciated that, with such a difference in melt temperature, the first metallic particles 108 can remain solid as the granules 106 are reflowed over a certain temperature range. In some implementations, the first binder component 110 can have a melt temperature of greater than about 100° C. such that, for example, the first binder component can be separated from water through the use of temperature.

In certain implementations, a temperature difference between the melt temperature and a burn-off temperature of the first binder component can be between about 100° C. and about 300° C. This range provides an operating window useful for sintering the three-dimensional object 102. For example, within this range the binder matrix 110 can be liquefied in the three-dimensional object 102 before the first binder component is burned off (e.g., during a sintering process), thereby maintaining the shape of the three-dimensional object 102 as the three-dimensional object 102 is exposed to increasing temperature (e.g., in a furnace) to sinter the first metallic particles 108. As the first metallic particles 108 are sintered to one another and/or to other particles, the binder matrix 110 can be burned off.

In some implementations, the first binder component can include an organic binder that is soluble in water or another liquid that is jetted from the printhead 118. Additionally, or alternatively, the first binder component can include one or more polymers. Examples of such polymers include polyethylene glycol (PEG), polyethylene, polylactic acid, polyacrylic acid, polypropylene, and combinations thereof.

Figure 2:
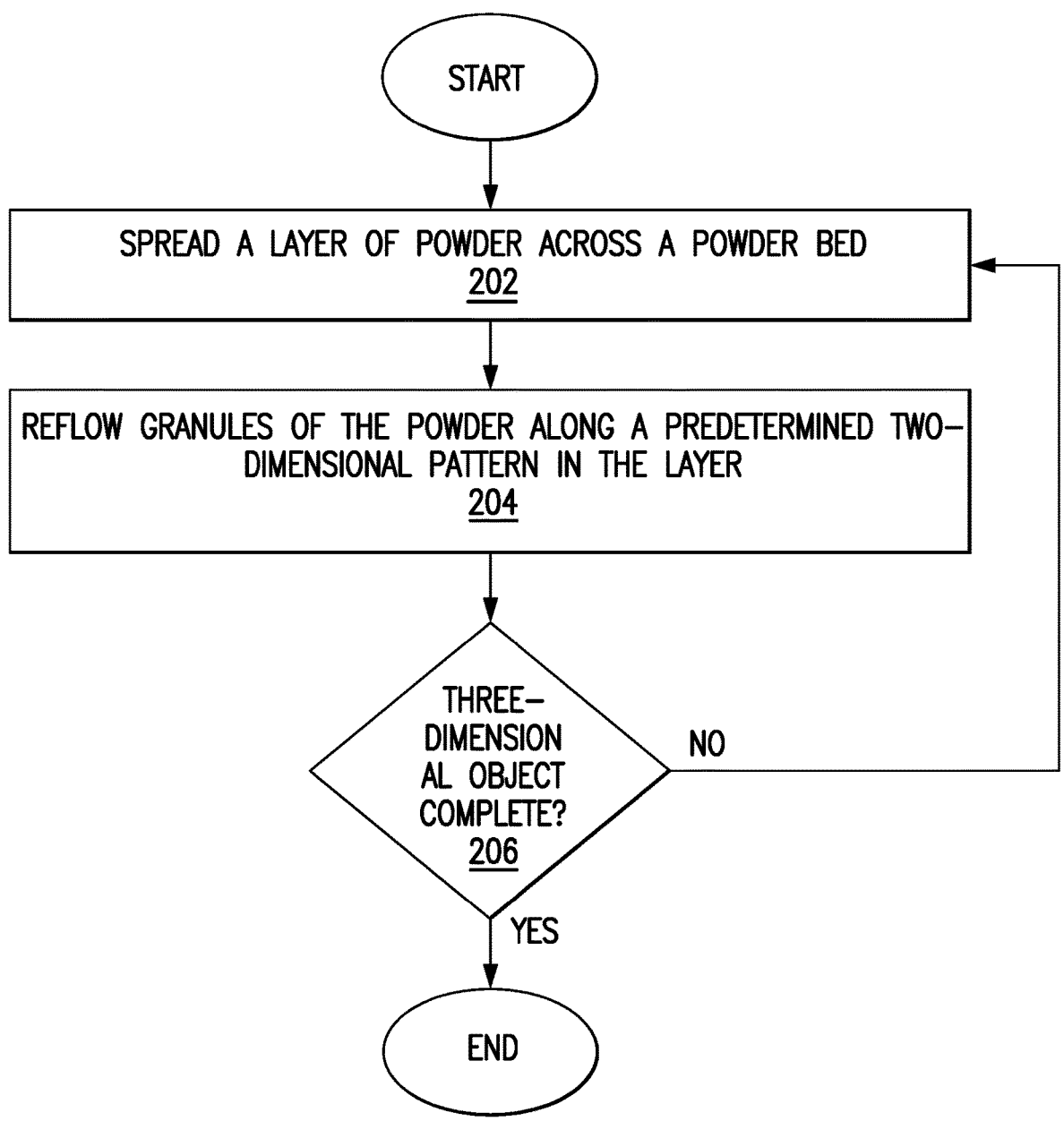
FIG. 2 is a flow chart of an exemplary method of selectively reflowing granules of a powder to form a three-dimensional object.

FIG. 2 is a flowchart of an exemplary method 200 of selectively reflowing powder granules to form a three-dimensional object. Unless otherwise specified or made clear from the context, the exemplary method 200 can be implemented using any one or more of the various different additive manufacturing systems described herein. For example, the method 200 can be implemented as computer-readable instructions stored on the storage medium 122 (FIG. 1A) and executable by the controller 120 (FIG. 1A) to operate the additive manufacturing system 100 (FIG. 1).

As shown in step 202, the exemplary method 200 can include spreading a layer of a powder across a powder bed. The powder can include any one or more of the granules described herein. Accordingly, the granules can include an agglomeration of first metallic particles in at least one component of a binder system.

As shown in step 204, the exemplary method 200 can include reflowing the granules along a predetermined two-dimensional pattern in the layer. The first binder component from the reflowed granules can bind the first metallic particles in the layer to one another and to one or more adjacent layers. The result, therefore, of reflowing the granules along the predetermined two-dimensional pattern in the layer is to form a layer of a three-dimensional object.

As shown in step 206, the exemplary method can include repeating the steps of spreading a layer of the powder across the powder bed and reflowing the granules along a respective predetermined two-dimensional pattern for each layer of a plurality of sequential layers to form a three-dimensional object in the powder bed. It should be appreciated that the predetermined two-dimensional pattern in each layer can vary from layer to layer in the plurality of sequential layers, particularly in instances in which the three-dimensional object being formed from predetermined two-dimensional patterns has a complex shape.

The granules can be reflowed along the predetermined two-dimensional pattern through the selective application of energy to the granules. That is, through the selective delivery of energy, the granules outside of the predetermined two-dimensional pattern can remain in a substantially solid form in the powder bed. Because the granules outside of the predetermined two-dimensional pattern associated with each layer remain substantially solid in the powder bed, the three-dimensional object can be removed from the remaining granules powder bed for subsequent processing, as described in greater detail below.

As an example, the selective delivery of energy chemically dissolves the first binder component agglomerating the first metallic particles in the granules. For example, from a printhead moving across the powder bed, a liquid can be jetted toward the powder bed along a predetermined two-dimensional pattern associated with a respective layer. The liquid can include a solvent of the first binder component. For example, if the first binder component is water soluble, the solvent jetted from the printhead can include water. Additionally, or alternatively, the solvent jetted from the printhead can include one or more of hexane, alcohol, limonene, and combinations thereof in instances in which such solvents are suitable for dissolving the binder matrix 110 in the powder bed.

In certain implementations, the binder system can include the first binder component in binder matrix 110 and a second binder component that is different from the first binder component. The first binder component can agglomerate the first metallic particles 108 in the granules 106, and the selective application of energy to the granules 106 can include jetting the second component from the printhead 118 to locally complete the binder system along the predetermined two-dimensional pattern. For example, the second component jetted from the printhead 118 can cross-link the first binder component in the granules 106 in the powder bed 114. Additionally, or alternatively, the first binder component and the second binder component of the binder system can have different melt temperatures such that, as the three-dimensional object 102 is heated during a sintering stage, the first binder component and the second binder component can be removed from the three-dimensional object 102 in stages. Examples of the first binder component include polyethylene glycol, paracetic acid, and polylactic acid, and examples of the second binder component include another one of polyethylene glycol, paracetic acid, and polylactic acid. Thus, as a more specific example, the first component can include polyethylene glycol and the second component can include one of paracetic acid and polylactic acid.

Figure 3:
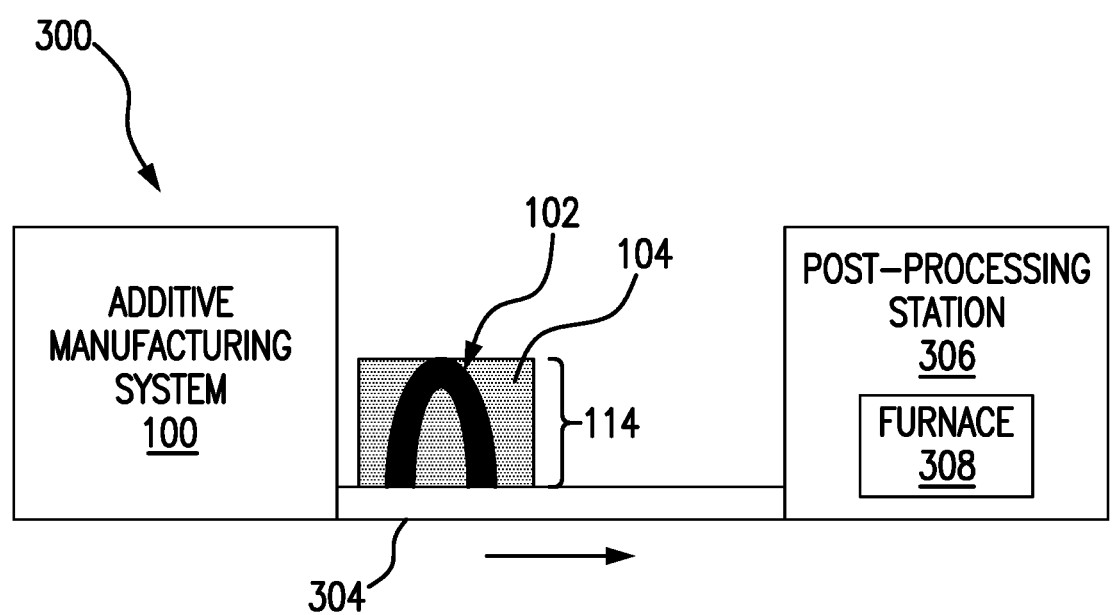
FIG. 3 is a schematic representation of an additive manufacturing plant including the additive manufacturing system of FIG. 1.

Referring now to FIGS. 1A, 1B, and 3, an additive manufacturing plant 300 can include the additive manufacturing system 100, a conveyor 304, and a post-processing station 306. The powder bed 114 containing the three-dimensional object 102, formed as a green part, can be moved along the conveyor 304 and into the post-processing station 306. The conveyor 304 can be, for example, a belt conveyor movable in a direction from the additive manufacturing system 100 toward the post-processing station 306. Additionally, or alternatively, the conveyor 304 can include a cart on which the powder bed 114 is mounted and, in certain instances, the powder bed 114 can be moved from the additive manufacturing system 100 to the post-processing station 306 through movement of the cart (e.g., through the use of actuators to move the cart along rails or by an operator pushing the cart).

In the post-processing station 306, the three-dimensional object 102 can be removed from the powder bed 114. The powder 104 remaining in the powder bed 114 upon removal of the three-dimensional object 102 can be, for example, recycled for use in subsequent fabrication of additional parts. Additionally, or alternatively, in the post-processing station 306, the three-dimensional object 102 can be cleaned (e.g., through the use of pressurized air) of excess amounts of the powder 104.

The three-dimensional object 102 can undergo one or more debinding processes in the post-processing station 306 to remove all or a portion of the binder system from the three-dimensional object 102. In general, it shall be understood that the nature of the one or more debinding processes can include any one or more debinding processes known in the art and is a function of the constituent components of the binder system. Thus, as appropriate for a given binder system, the one or more debinding processes can include a thermal debinding process, a supercritical fluid debinding process, a catalytic debinding process, a solvent debinding process, and combinations thereof. For example, a plurality of debinding processes can be staged to remove components of the binder system in corresponding stages as the three-dimensional object 102 is formed into a finished part.

The post-processing station 306 can include a furnace 308. The three-dimensional object 102 can undergo sintering in the furnace 308 such that the first metallic particles 108 melt and combine with one another to form a finished part. Additionally, or alternatively, one or more debinding processes can be performed in the furnace 308 as the three-dimensional object 102 undergoes sintering. Further or instead, one or more debinding processes can be performed outside of the furnace 308.

While certain implementations have been described, other implementations are additionally or alternatively possible.

For example, while powders have been described as including only granules, it should be appreciated that powders of the present disclosure can include material in addition to granules. As an example, referring now to FIG. 4, a powder 404 can include granules 406 and second metallic particles 412 separate from the granules 406 (e.g., the second metallic particles 412 can be unagglomerated) and mixed with the granules 406. In general, unless otherwise specified or made clear from the context, the granules 406 can be any one or more of the granules described herein and, thus, can include any one or more of the features of the granules 106 described with respect to FIG. 1B. More specifically, the granules 406 can include first metallic particles 408 agglomerated in at least one component 410 of a binder system, the first metallic particles 408 can include any one or more features of the first metallic particles 108 described with respect to FIG. 1B, and the first binder component of the binder matrix 410 can include any one or more features described with respect to FIG. 1B. Also, unless otherwise specified or made clear from the context, the powder 404 can be used in place of the powder 104 in the additive manufacturing system 100 (FIG. 1A) to form the three-dimensional object 102.

The granules 406 can be dispersed in the second metallic particles 412 in a flowable mixture that can remain mixed as the powder 404 is moved from a powder supply (e.g., the powder supply 112 in FIG. 1A) to a powder bed (e.g., the powder bed 114 in FIG. 1A) to form a layer of the powder. That is, the granules 406 and the second metallic particles 412 can have similar flow properties. The flow properties of the granules 406 and the second metallic particles 412 can be quantified through any one or more of various different known methods for quantifying powder. For example, the respective angles of repose of the granules 406 and the second metallic particles 412 can be useful as a proxy for the flow characteristics of each material. Thus, for example, the granules 406 can have a first angle of repose, the second metallic particles 412 can have a second angle of repose, and the first angle of repose and the second angle of repose can be substantially equal (e.g., differing from one another by less than about ±10 percent). With similar angles of repose, the granules 406 and the second metallic particles 412 can have similar flow characteristics and, accordingly, the granules 406 and the second metallic particles 412 can remain substantially uniformly mixed with one another as the powder 404 is moved. Thus, each layer of the powder 404 in a plurality of sequential layers can include a mixture of the granules 406 and the second metallic particles 412. The mixture of the granules 406 and the second metallic particles 412 in each layer can be, for example, substantially uniform in each layer. For example, the volume percentage of the second metallic particles 412 along each layer can vary by less than about 5 percent.

As the first binder component of the binder matrix 410 is selectively reflowed in the granules 406 along a predetermined two-dimensional pattern in each layer, the first binder component 410 can bind the first metallic particles 408 and the second metallic particles 412 in the layer to one another and to one or more adjacent layers. That is, as the granules 406 are reflowed, the first binder component can spread to the second metallic particles 412. The first binder component that spreads to the second metallic particles 412 can, therefore, bind the second metallic particles 412 along the predetermined two-dimensional pattern in each layer.

In general, the volume percentage of the binder system in a three-dimensional object formed from the powder 404 can be a target value (e.g., about one third) suitable for holding the three-dimensional object together through post-processing while also being removable from the three-dimensional object (e.g., through sintering) to form a dense part. Because at least a portion of the binder system is provided to the three-dimensional object through the granules 406 of the powder 404, it should be appreciated that achieving a target volume of the binder system in a three-dimensional object can be based on selecting relative volumetric percentages of the first metallic particles 408 agglomerated in the granules 406 of the powder, the first binder component, and the second metallic particles 412 that are unagglomerated in the powder 404.

Figure 4:
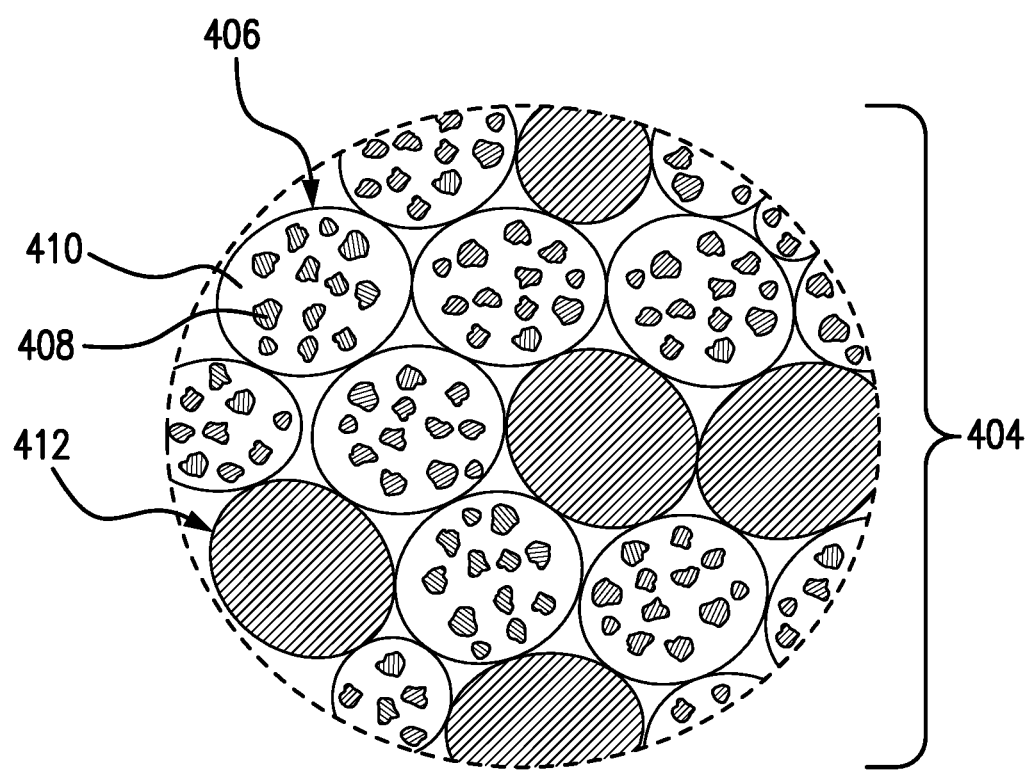
FIG. 4 is an enlarged view of a powder useable with the additive manufacturing system of FIG. 1A to form a three-dimensional object, with the powder including granules and second metallic particles.
Figure 5:
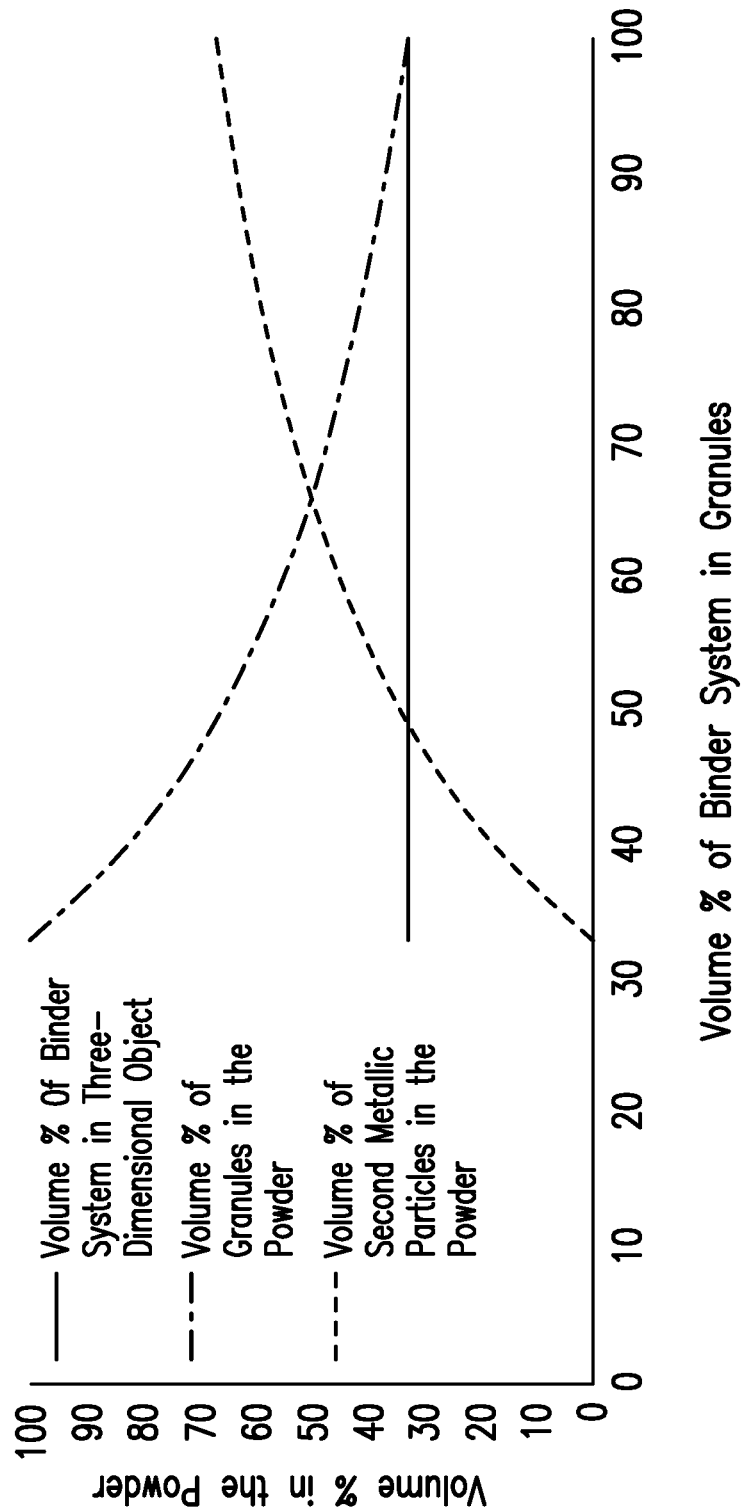
FIG. 5 is a graphical representation of volumetric percentages of components of the powder of FIG. 4 in implementations in which a binder system is introduced into a three-dimensional object exclusively through granules of the powder and the target concentration of the binder in the three-dimensional object is 33 percent.

Referring now to FIGS. 4 and 5, FIG. 5 is a graphical representation of volumetric percentages of components of the powder 404 in implementations in which the binder system is introduced into a three-dimensional object exclusively through the granules 406 (e.g., the liquid delivered from the printhead does not include any portion of the binder system) and the target concentration of the binder in the three-dimensional object is 33 percent, by volume. In general, as shown in FIG. 5, as more unagglomerated second metallic particles 412 are added to the powder 404, more binder is required in the granules 406 to compensate for the unagglomerated second metallic particles 412 and, thus, maintain the overall percentage of the at least one component 410 of the binder system in the powder at the target 33 percent.

While FIG. 5 represents volumetric percentages of binder in implementations in which the binder system is introduced into a three-dimensional object exclusively through the granules 406, it should be appreciated that liquid jetted from a printhead (e.g., according to any one or more of the methods described herein) moving across the powder bed can include a portion of the binder system. The addition of a portion of the binder system through liquid jetted from a printhead can provide an additional degree of freedom for establishing volumetric relationships between components of the powder 404 to achieve a target binder concentration in the three-dimensional object being formed.

Referring again to FIG. 4, the powder 404 including the granules 406 and the second particles 412 can have a bimodal powder particle distribution. For example, the granules 406 can have a larger average particle size (e.g., about 50 microns) than an average particle size (e.g., about 7 microns) of the second particles 412. Such a bimodal powder particle distribution can be useful for facilitating, as an example, packing as the powder 404 is spread across a powder bed (e.g., across the powder bed 114 in FIG. 1A).

The first metallic particles 408 in the granules 406 can have an average particle size smaller than an average particle size of the second metallic particles 412. For example, the second metallic particles 412 can have an average particle size that is flowable while the first metallic particles 408 can have an average particle size that is not flowable without agglomeration into the granules 406 (made up of multiple first metallic particles 408 agglomerated). In certain instances, the second metallic particles 412 can have an average particle size in a microparticle range. Additionally, or alternatively, the first metallic particles 408 can have an average particle size of greater than about 1 micron and less than about 5 microns. Further, or instead, it should be appreciated that, because the size of the first metallic particles 408 is not limited by the ability to flow, the first metallic particles 408 can have an average particle size in a nanoparticle range in certain instances.

Differences in average particle size between the first metallic particles 408 and the second metallic particles 412 can be useful, for example, for sintering the first metallic particles 408 and the second metallic particles 412 separately. That is, because sintering temperature is a function of particle size, the smaller average particle size of the first metallic particles 408 can be useful for sintering the first metallic particles 408 before the second metallic particles 412 are sintered. As an example, the first metallic particles 408 can be sintered in a three-dimensional object (such as the three-dimensional object 102 in FIG. 1A) to reduce the likelihood of sagging in the three-dimensional object as temperature is further increased to sinter the second metallic particles 412.

The second metallic particles 412 that are unagglomerated in the powder 404 can include any one or more of the materials described herein and, further or instead, can include materials that are not generally amenable to being formed into particle sizes small enough for agglomeration in the granules 406. That is, the material composition of the first metallic particles 408 and the second metallic particles 412 can include any combination of materials suitable for forming a target composition in a finished part.

In certain implementations, the first metallic particles 408 can include a first material, and the second metallic particles 412 can include a second material different from the first material. A three-dimensional object (e.g., the three-dimensional object 102 in FIG. 1A) formed from the powder 404 including such different materials can include particles dispersed in each layer, with the particles in each layer including a plurality of materials (e.g., first material, the second material, and, optionally, one or more additional materials). These particles can be bound to one another and to one or more adjacent layers by a binder system including the first binder component. Continuing with this example, the three-dimensional object formed from the powder 404 including the granules 406 and the second metallic particles 412 and having a plurality of materials (e.g., the first material and the second material) in each layer can be sinterable to form a brown part having microstructures including at least one of the plurality of materials (e.g., the first material) distributed in a matrix of at least another one of the plurality of different materials (e.g., the second material). These microstructures are not achieved by mixing particles of different materials together with one another in a powder and, thus, are an advantage of a fabrication process in which the granules 406 including the first metallic particles 408 of a first material are reflowed in a mixture including the second metallic particles 412 of a second material. For example, microstructures achievable in a brown part formed from the powder 404 including the first metallic particles 408 agglomerated in the granules 406 and further including the second metallic particles 412 can include areas of high hardness and high wear resistance distributed in a matrix of a relatively softer phase at a macro scale. Additionally, or alternatively, the amount of the hard, wear resistant phase can be varied depending on the volume percentage of the granules 406 in the powder 404.

The first material of the first metallic particles 408 and the second material of the second metallic particles 412 can be alloyable with one another. That is, a three-dimensional object (e.g., the three-dimensional object 102 in FIG. 1A) including the first material and the second material can be sintered, and the first material and the second material bound together by a binder system in the three-dimensional object can alloy with one another to form an alloy including the first material and the second material in a finished part. The alloy in the finished part can have a target concentration based on, for example, the relative volumetric concentration of the first metallic particles 408 and the second metallic particles 412 in a powder bed in which the three-dimensional object is formed. For example, the first material and the second material can be alloyable with one another to form steel. As a more specific example, the second material can include one or more of iron and stainless steel (e.g., having an average particle size of greater than about 5 microns and less than about 25 microns). Further, or instead, the first material can include one or more of tungsten, carbide, tungsten carbide-cobalt, and molybdenum to form microstructures in a matrix of the second material to form zones of local hardness that can improve wear resistance.

The first material can include a metal matrix composite. As used herein, a metal matrix composite shall be understood to include a composite material including at least one metal and another material, which can include one or more of another metal, a ceramic material, or an organic compound. Thus, for example, a metal matrix composite useable as the first material can include a composite material including a metal and carbon. Accordingly, continuing with this example, the metal matrix composite of the first material can introduce carbon into an alloy to form an alloy having a target concentration of carbon.

The first material and the second material can, further or instead, have different hardness. As a specific example, the first material can have a first hardness, the second material can have a second hardness, and the second hardness can be less than the first hardness. Thus, in certain instances, the small size of the first metallic particles 408 can be useful for introducing a hard material into a three-dimensional object, particularly in instances in which relatively small volumetric concentrations of the hard material are required for a target alloy composition in a finished part formed from the three-dimensional object.

In certain implementations, an alloy formed from the first material of the first metallic particles 408 and the second material of the second metallic particles 412 can have a smaller grain structure than an alloy formed of the second material alone. In general, the size of the grain structure is associated with strength of the alloy. Accordingly, it should be appreciated that the reduction in grain size produced by the addition of the first metallic particles 408 can increase the strength of a metal including the second material.

While the first material of the first metallic particles 408 and the second material of the second metallic particles 412 have been described as being alloyable with one another, it should be appreciated that, in certain implementations, first material and the second material can be unalloyable with one another. For example, the first material can include one tungsten and the second material can include copper. Further or instead, the first material can include molybdenum, and the second material can include copper. More generally, in an unalloyable combination, the first material can include a metal matrix composite and, additionally, or alternatively, the first material can have a higher hardness than the second material.

Figure 6:
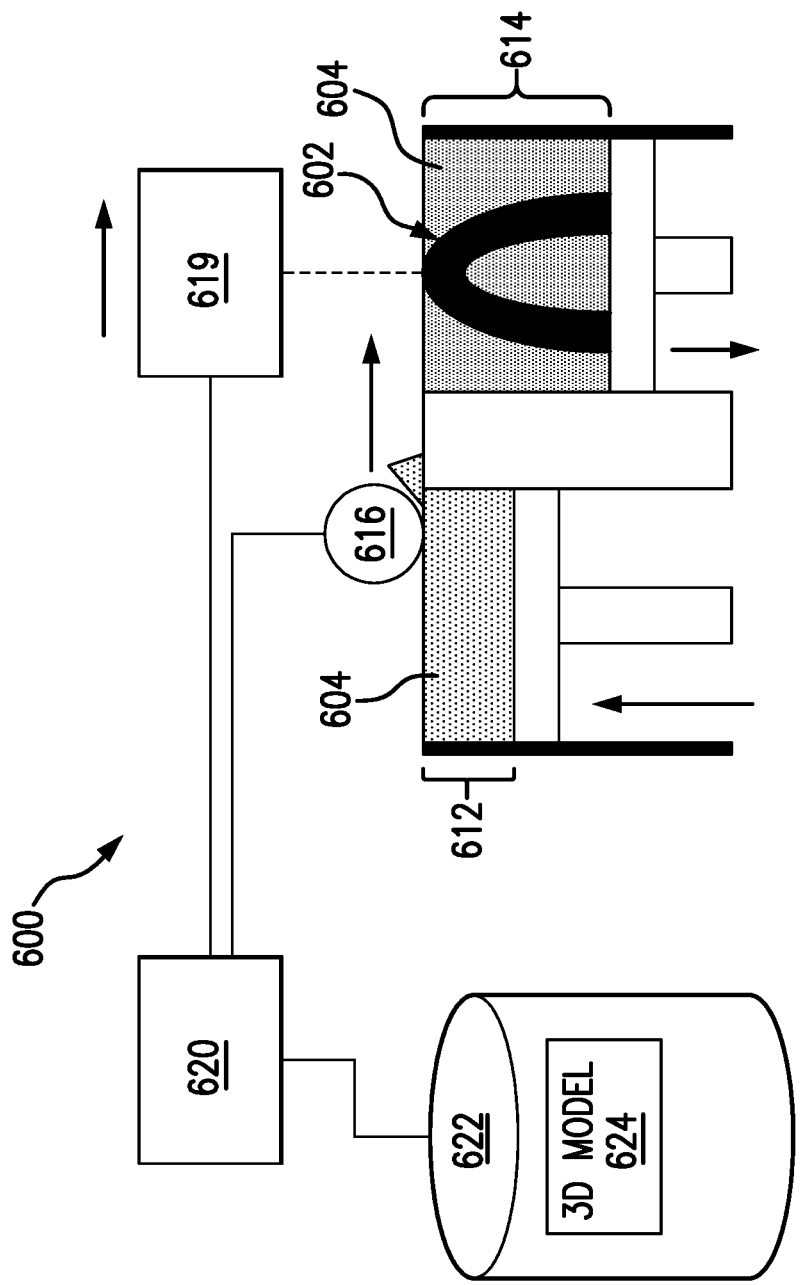
FIG. 6 is a schematic representation of an additive manufacturing system for forming a three-dimensional object.

As another example, while reflowing granules has been described as including chemically dissolving the first binder component, other types of energy can additionally or alternatively be delivered to the granules to reflow the granules. As an example, referring now to FIG. 6, an additive manufacturing system 600 can include an energy source 619 movable across a powder bed 614. Unless otherwise specified or made clear from the context, the additive manufacturing system 600 in FIG. 6 shall be understood to be operable in a manner analogous to the operation of the additive manufacturing system 100 in FIG. 1A. Accordingly, for the sake of concise and clear description, elements with "600"-series element numbers in the additive manufacturing system 600 in FIG. 6 shall be understood to be the same as corresponding elements with "100"-series element numbers in the additive manufacturing system 100 in FIG. 1A, unless otherwise specified or made clear from the context. More specifically, the additive manufacturing system 600 in FIG. 6 shall be understood to be analogous to the additive manufacturing system 100 in FIG. 1A, except that the printhead 118 is replaced with the energy source 619. Thus, for example, the controller 620 shall be understood to be analogous to the controller 120 and, therefore, can carry out any one or more of the methods described herein. Similarly, the spreader 616 shall be understood to be analogous to the spreader 116, the powder supply 612 shall be understood to be analogous to the powder supply 112, the powder bed 614 shall be understood to be analogous to the powder bed 614, etc. Further, unless otherwise specified or made clear from the context, the powder 604 shall be understood to include any one or more of the powders described herein and, thus, shall be understood to include one or more of the powder 104 (FIGS. 1A and 1B) and the powder 404 (FIG. 4).

The energy source 619 can thermally dissolve the first binder component with little to no charring or vaporization of that first binder component. For example, the energy source 619 can include one or more of an electron beam, a laser, and directed infrared. In use, thermal energy from the energy source 619 can be directed toward the powder 604 in the powder bed 614 in a predetermined two-dimensional pattern in each layer of the powder 604. Along the predetermined two-dimensional pattern in each respective layer, heat from the energy source 619 can heat the first binder component to a temperature greater than a melt temperature of that first binder component and less than its burn-off temperature. Thus, heat from the energy source 619 can reflow the granules of the powder 604 along each layer to bind metallic particles in each layer to each other and to one or more adjacent layers to form a three-dimensional object. The use of the energy source 619 can, for example, reduce or eliminate the need to deliver a second binder component and/or a solvent to the powder bed 614 and, thus, for example, can reduce or eliminate the need to maintain a printhead and an associated supply of liquid.

Coated Powder

In binder jet-based additive manufacturing, there may be stringent requirements associated with the powders that form the powder bed. For example, there may be a need to have a powder exhibiting good flowability suitable for spreading. Additionally, or alternatively, there may be a need to have a powder exhibiting sinterability suitable to facilitate densifying a three-dimensional object to a reasonable percent of theoretical density. Two or more different powders may be blended together (either elemental powders or alloyed powders) and formed into a shape and then eventually consolidated to high densities during the sintering step. In the case of blended powders, the sintering step may serve the dual purposes of both densification and homogenization (e.g., Fe—Ni, Fe—Ni—Mo, WC—Co, Cr-rich prealloy particles with carbonyl iron powder, and combinations thereof). With certain blended powder systems in which the individual components have small or negligible mutual solubility (W—Cu, Mo—Cu, diamond-Ni, diamond-Cu, and combinations thereof), the sintering step may create the same dense composite structures as those of the final product.

At various handling steps, powder segregation that occur in various different powder blends. The issue of segregation of blended powders is amplified in instances in which the powders have large density differences or large particle size differences and, additionally or alternatively, in binder jetting processes in which loose powder is spread using a roller or a doctor blade. In general, the segregation that can result from the use of blended powders, may result in inhomogeneous microstructures that, in turn, may lead to poor properties. The following are examples of powder blends that are useful in binder jetting but tend to segregate due to density differences and/or particle size differences when a powder formed of one or more of these blends is spread across a powder bed (percentages are in weight percent): 85% W, 15% Cu; 90% Mo; 10% Cu; 93% Fe and 7% Ni; 90% W, 7% Ni, and 3% Fe; 90% diamond and 10% Ni; 92% WC and 8% Co; and 97% Fe and 3% Si. However, when the different materials forming the final alloy or composite are in the form of a coated powder of the target composition, the powder behaves as a single material when spread on the powder bed as part of a binder jetting process. Accordingly, complications (e.g., in the form of inconsistent results) associated with segregation of the powder may be reduced.

Figure 7B:
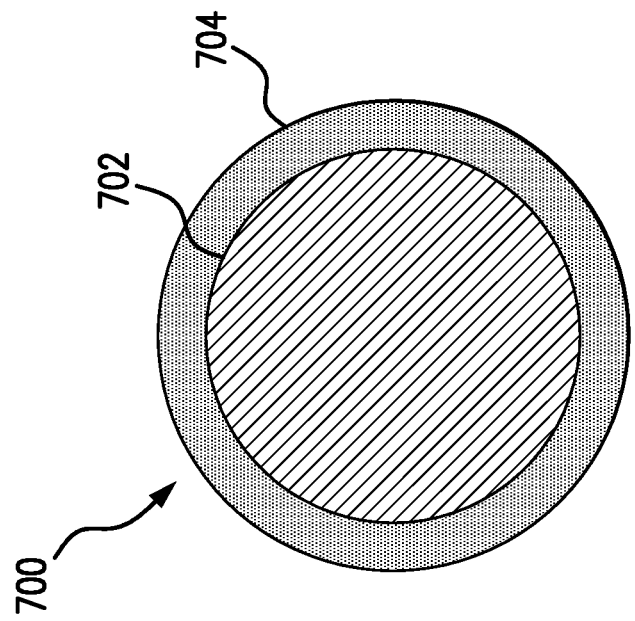
FIG. 7B is a side view of the particle of FIG. 7A taken along the cross-section 7B-7B indicated in FIG. 7A.
Figure 7A:
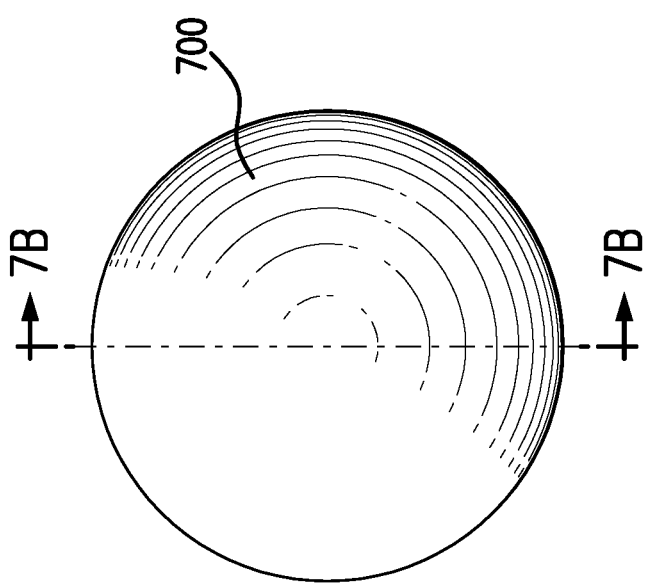
FIG. 7A is a side view of a particle of a powder for additive manufacturing.

Referring now to FIGS. 7A and 7B, a powder 700 may include a first material 702 coated with a second material 704, with the second material 704 differing from the first material 702. The coating of the second material 704 on the first material 702 may be achieved using any one or more of various different techniques suitable for achieving a sustainable coating of the second material 704 on the first material 702 (e.g., fluidized bed chemical vapor deposition, coatings using chemical solution-based techniques, and combinations thereof). Examples of functional combinations of the first material 702 and the second material 704 according to the present disclosure may include any one or more of the following: tungsten particles coated with copper; molybdenum powder particles coated with copper; tungsten carbide particles coated with silver; tungsten carbide particles coated with nickel; tungsten carbide particles coated with cobalt; iron particles coated with nickel; tungsten particles coated with nickel; tungsten particles coated nickel and/or iron; diamond particles coated with copper; and diamond particles coated with nickel. As described in greater detail below, the powder 700 including the first material 702 coated with a second material 704 may advantageously facilitate overcoming challenges associated with the use of blended powders as part of binder jetting fabrication processes. In the description that follows, unless otherwise specified or made clear from the context, the powder 700 should be understood to be useable in any one or more of the systems described herein to carry out binder jetting fabrication of three-dimensional objects. Thus, for example, it should be generally understood that the powder 700 may be used as part of one or more binder jetting fabrication processes carried out using the additive manufacturing system 100.

The powder 700 may have an average particle size of greater than about 5 microns and less than about 10 microns. In certain implementations, the thickness of the coating formed by the second material 704 on the first material 702 may be greater than about 1 micron and less than about 9 microns. In general, it should be appreciated that the average relative sizes of the first material 702 and the second material 704 in the particles of the powder 700 may be a function of the target composition of the metal in the final three-dimensional object.

In certain implementations, the second material 704 has a lower melting point than the first material 702, which may be useful for facilitating wetting of the second material 704. In some implementations, however, the first material 702 may have a lower melting point than the second material 704. For example, the first material 702 may be aluminum powder, and the second material 704 may be nickel. Continuing with this example, coating aluminum powder with nickel may be particularly useful for reducing explosivity of aluminum. Further, the reaction of nickel and aluminum to form nickel aluminide is an exothermic reaction, which may be useful for reactive sintering.

Sintering

In certain implementations, the composition of the first material 702 and the second material 704 may be based on one or more sintering goals associated with the powder 700. As used in this context, a sintering goal may be understood to be a desired interaction between the first material 702 and the second material 704 during sintering to produce desired physicochemical properties in a finished part formed from the powder 700. In general, the desired interaction may be facilitated by reducing the likelihood of segregation of the first material 702 and the second material 704 by coating the second material 704 onto the first material 702. In certain instances, density differences between the first material 702 and the second material 704 may be quite large, and the coating of the second material 704 on the first material 702 may be particularly useful for reducing the likelihood of segregation of these components, as compared to segregation that may occur in a blend of elemental forms of the first material 702 and the second material 704.

Densification and Homogenization

In certain implementations, a goal of sintering the powder 700 may include densification and chemical homogenization (solid state). Nickel coated iron powder is an example of an implementation of the powder 700 useful for achieving this sintering goal. For example, forming the powder 700 as nickel coated on iron may reduce the diffusion distance of nickel into iron. Such a reduction in diffusion distance may, for example, facilitate forming a more homogeneous microstructure at least because a reduction in diffusion distance may reduce the chances of forming pools of nickel that are not fully diffused in iron.

Densification by Liquid Phase with Solubility

In some implementations, a goal of sintering the powder 700 may include densification by forming a liquid phase during sintering and the first material 702 and the second material 704 have solubility. As an example, the first material 702 may be tungsten carbide powder and the second material 704 may be one or more of nickel, cobalt, iron, or a combination thereof.

As an example of densification using a liquid phase with solubility, the powder 700 may be used to form a hard metal. As a more specific example, the powder 700 may be formed by coating tungsten carbide powder with cobalt. Sintering a three-dimensional object formed of the powder 700 including tungsten carbide powder coated with cobalt may take place at a temperature at which the cobalt is liquid and, in this liquid form, takes some of the tungsten carbide into solution. Combining cobalt and tungsten carbide in this way may facilitate wetting of the cobalt and, therefore, may reduce the likelihood of forming cobalt lakes in a finished three-dimensional object. In general, cobalt lakes shall be understood to be local small pockets of cobalt formed because of segregation. Because cobalt is much softer than tungsten carbide, cobalt lakes generally represent areas of weakness of a hard metal. Accordingly, reducing the likelihood of cobalt lakes should generally be understood to form a higher quality hard metal.

As an additional or alternative example of densification using a liquid phase with solubility to form a hard metal, the powder 700 may be formed by coating tungsten with nickel and coating the nickel with iron such that the final three-dimensional object formed of this instance of the powder 700 is formed of a tungsten heavy alloy. The order of coatings on tungsten may, in some instances, be reversed such that the nickel is coated on the iron to reduce, for example, the likelihood of oxidation of the powder 700 during storage.

Densification by Liquid Phase with Negligible Solubility

In certain implementations, a goal of sintering the powder 700 may include densification by forming a liquid phase during sintering and the first material 702 and the second material 704 have negligible solubility. For example, the second material 704 may be a lower melting point material, as compared to the first material 702. Continuing with this example, the second material 704 may have little solubility for the first material 702, and sintering may occur at a temperature at which the second material 704 is in the liquid phase. Examples of combinations of the first material 702 and the second material 704 useful for achieving this sintering goal of forming a liquid phase during sintering while the two materials have negligible solubility include, but are not limited to: the first material 702 is a tungsten powder and the second material 704 is copper; the first material 702 is molybdenum powder and the second material 704 is copper; and the first material is tungsten carbide powder and the second material 704 is silver.

As an example of densification using a liquid phase with negligible solubility, one of tungsten and copper may be coated on the other one of tungsten and copper to form the powder 700. Tungsten and copper have widely different melting temperatures, densities, thermal expansion coefficients, and electrical conductivities, and a powder formed of a blend of these two materials tends to segregate. The powder 700 formed from a coating of one of tungsten and copper on the other one of tungsten and copper may be useful, for example, for binder jetting to form heat spreaders, such as may be useful for removing heat from a small area. In certain instances, a finished three-dimensional part formed from the powder 700 including tungsten and copper may have an interconnected structure of both copper and tungsten with smaller amounts of copper in it. Additionally, or alternatively, a combination of molybdenum and copper may be advantageously formed as the powder 700 including one of molybdenum and copper coated on another one of molybdenum and copper.

Ferrous Metal

In certain instances, the powder 700 may facilitate the use of a ferrous metal with an aqueous binder, which may be particularly useful for forming low alloy steels. That is, the first material 702 may be a ferrous metal, and the second material 704 may be a metal that is less prone to oxidation in the presence of water. As a more specific example, the first material 702 may be iron, and the second material 704 may be nickel.

Microspheres

In certain implementations, the first material 702 may be glass microspheres, and the second material 704 may be nickel. Continuing with this example, lightly sintering a three-dimensional object including the powder 700 formed of such glass microspheres coated with nickel may produce an open pore structure. In turn, this open pore structure may be infiltrated with aluminum.

In some implementations, the first material 702 may be glass microspheres, and the second material 704 may be aluminum, and sintering a three-dimensional object formed of this instance of the powder 700 may produce a low-density foam-type material. In particular, the foam type material may be a closed cell foam. Further, or instead, the foam-type material may be useful in applications requiring lightweight materials capable of withstanding high temperatures.

While glass microspheres have been described, it should be appreciated that other types of microspheres may be additionally or alternatively used as the first material 702 of the powder 700. For example, the first material 702 of the powder 700 may be ceramic microspheres. Additionally, or alternatively, the first material 702 of the powder 700 may be molite.

In instances in which the first material 702 of the powder 700 includes microspheres, the volume within the microspheres may be filled with any one or more of various different gases, as may be useful for a particular application. For example, the microspheres may be filled with air. Additionally, or alternatively, the microspheres may be filled with nitrogen, such as may be useful for the formation of an aluminum nitride layer in some instances.

In general, the microspheres may have any of various different sizes compatible for use in binder jetting and, more specifically, sizes that may be spread uniformly and easily. For example, the microspheres may have an average particle size of greater than about 20 microns and less than about 80 microns (e.g., greater than about 20 microns and less than about 50 microns).

Lightweight materials, preferably aluminum-base alloys, present challenges to powder metallurgy approaches due to rapid formation of an oxide skin and the low melting temperature of aluminum. Dispersing micro-balloons or microspheres made of ceramics or glass in a binder matrix to form the granules discussed above enables production of lightweight aluminum coated composites. The micro-balloons or microspheres form a porous skeletal structure that can be infiltrated with aluminum. Though the focus is on aluminum, the ceramic micro-balloons and ceramic microspheres may be used as reinforcements for other alloy systems, where the ceramic micro-balloons or ceramic microspheres are coated with different metals. Advantages of the metal coating include enhanced formation of necks during sintering, strong skeletal structure and enhanced wetting.

A process for making Al-alloy matrix composite utilizes lightweight ceramic microspheres reinforced with an aluminum alloy matrix. Preferably, the ceramic microspheres possess a crush strength in excess of 60,000 psi for sufficient ceramic reinforcement. Lower strength microspheres can be used if decreased strength is acceptable. Alternatively, fully dense larger ceramic particles coated with metals can also be used as the reinforcement. The ceramic microspheres are shaped into complex 3D geometries through the use of any of the following shaping techniques: a) freeform fabrication through the use of an organic binder containing extrusion based 3D printing technology; b) a method where the microspheres are spread in layers and formed into 3D shapes through the use of a binder jet technique; c) powder injection molding of microspheres dispersed in a binder system that is then injection molded into a desired shape.

Any of these green shapes are subjected to some form of debinding technique where the organic binder is removed followed by sintering to create a structure that has interconnected porosity and good shape integrity. The complex shaped structure can then be infiltrated with a desired aluminum based alloy to create a lightweight Al-alloy matrix composite. This process is capable of producing extremely complex shaped composite parts.

The porous skeletal structure can also be coated with different metallic materials by several different methods including chemical vapor deposition. Having a metallic coating on the surface of the skeletal structure formed by the ceramic microspheres can influence the wetting behavior of the aluminum alloy during the infiltration step.

The forming of complex shaped aluminum parts that have been preformed using some of the shaping methods such as extrusion of a powder-binder mixture, powder injection molding or a binder jet type of process is extremely challenging. This is primarily due to the formation of the stable alumina skin that form on most aluminum powder particles. As none of the above processes utilizes high pressure, the oxide skin on the powder surfaces often remains intact and hinders sintering. Thus, conventional sintering of shaped Al-alloy parts does not generally lead to complete densification. Several techniques have been developed to infiltrate aluminum alloys into a second aluminum alloy based skeleton to form a dense complex shaped structure. The skeleton is made quite rigid through the use of nitrogen sintering atmosphere that forms an aluminum nitride layer on the surface of the skeletal structure.

In this process, the skeletal structure is formed by the sintering of lightweight ceramic microspheres into a porous shaped component. Some of the major advantages of using the ceramic microspheres are the following:

1. The coarse ceramic microspheres are spherical and have very low friction allowing the material to flow and spread very well (important for binder jet type process) as well as yield low viscosity when mixed with organic thermoplastic based binders and therefore allow high solids loading.
2. The ceramic microspheres are lightweight and can have densities around 2.5 g/cc which is lower than most of the aluminum alloys.
3. Properly designed ceramic microspheres can have very high crush strength that is greater than 60 ksi. However, these ceramic micro-balloons may not be flowable. To get higher flowability, the coarser micro-balloons will may be used with a penalty of lower strength. Alternatively, the ceramic micro-balloons may be agglomerated in a binder matrix and formed into granules as described above.
4. Typically, the ceramic microspheres will have softening point that exceeds 1000° C. Glass based microspheres will have a much lower softening point.
5. The ceramic microspheres are typically made from alumina-silica which would allow good wetting then being infiltrated with Al-based alloys. Enhanced wetting by the infiltrating aluminum-based alloys is achieved by coating the ceramic microspheres, or sintered ceramic skeleton, with an aluminum nitride layers. Such as layer may be formed by sintering the ceramic microspheres or heating the sintered ceramic skeleton in a nitrogen rich atmosphere.

The above-mentioned attributes of the ceramic microspheres therefore present an ideal skeletal structural material that can be sintered and then infiltrated with an Al-alloy to form a fully dense composite structure. The composite structure is expected to yield a high strength, lightweight, moderate temperature resistant composite structure that can find numerous applications in the automotive, aerospace, and defense areas.

Several different variations can be adapted to achieve the ceramic microsphere reinforced aluminum alloy matrix composite structures.

Case I:

Ceramic microspheres (alumino silicate) having a particle size in the range of 1 to 100 micrometer can be used. A typical particle size will be in the range of 2 to 20 micrometer. For lower strength, lower density, but higher flow, larger particles (50 to 150 micrometers) can be used. For higher strength, dense ceramic particles can be used (but will likely need a coating for neck formation). Ceramic microspheres in the desired size range can be mixed with a thermoplastic organic binders and formed into pellets. These pellets can then be used as the basis for extrusion based freeform fabrication to form complex shaped 3D structures. The organic binders can then be removed through solvent debinding and/or thermal debinding followed by sintering. After sintering, the powder mass will have a skeletal structure which is rigid due to neck formation. Thus, the end product after sintering will be a shaped skeletal structure with interconnected porosity that will be interpenetrating in nature. This shaped porous skeletal structure can then be infiltrated with a desired Al-alloy which is expected to wet the alumino-silicate microspheres. The end product is expected to be a complex shaped, lightweight, high strength composite material.

Sintering of the aluminum coated ceramic particles in a nitrogen-rich environment at a temperature and time sufficient for sintering, such as 500° C.-600° C. (preferably 540° C.-560° C.) for 300-600 minutes will cause an AlN layer to form on the ceramic skeleton. The AlN layer enhances wetting by the molten Al-based infiltrant.

Figure 8:
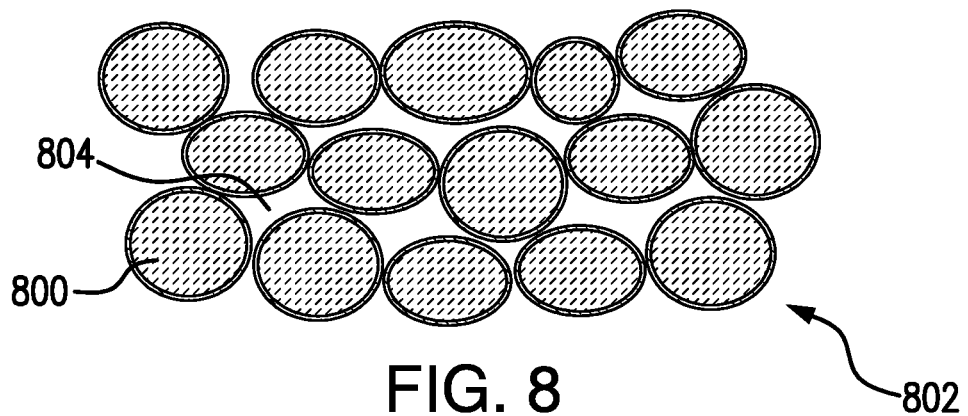
FIG. 8 is a cross-sectional representation of ceramic microspheres forming a porous interconnected skeleton.
Figure 9:
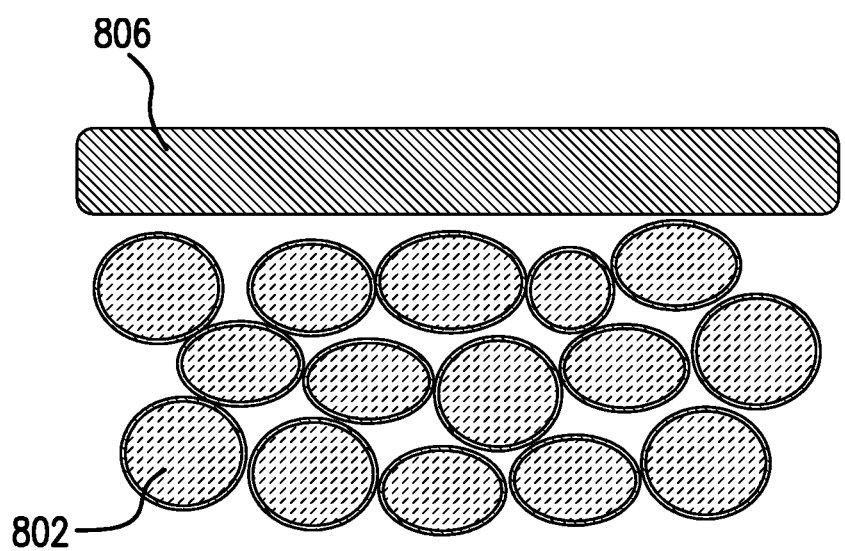
FIG. 9 illustrates the porous interconnected skeleton with an infiltrant alloy in contact with the skeleton.
Figure 10:
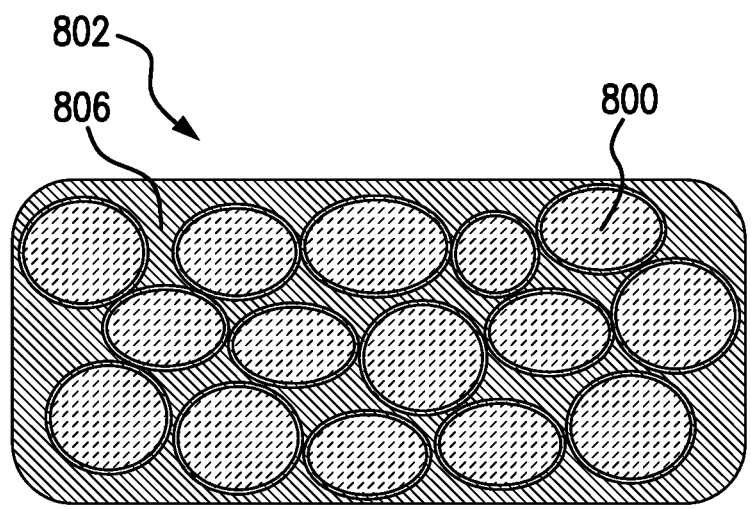
FIG. 10 illustrates the porous interconnected skeleton following infiltration of the infiltrant alloy.

FIG. 8 illustrates in cross-sectional representation ceramic microspheres 800 that have been printed using a binder based extrusion process, debound and sintered to form a porous skeleton 802 with interconnected porosity 804. FIG. 9 shows the schematic where the sintered ceramic microspheres 802 are being prepared for an infiltration process with a block 806 on top of the porous skeleton 802 that is the Al-alloy that will be infiltrated. FIG. 10 shows a schematic of the final composite structure 802 where the skeletal structure based on the ceramic microspheres 800 is infiltrated with the Al-alloy 806 forming a composite.

Case II:

Ceramic microspheres (alumino silicate) having a particle size in the range of 1 to 100 micrometer can be used. However, a typical particle size will be in the range of 2 to 20 micrometer. For lower strength, lower density, but higher flow, larger particles (50 to 150 micrometers) of microspheres can be used. For higher strength, dense ceramic particles can be used (but will likely need a coating for neck formation). Ceramic microspheres in the desired size range can be mixed with a thermoplastic based organic binders and formed into pellets. These pellets can then be fed into the hopper of an injection molding machine and injected into a die cavity to form a complex shaped green part. The organic binders can then be removed through a combination of solvent debinding and thermal debinding followed by sintering. After sintering the powder mass will have a skeletal structure which is expected to be rigid due to the neck formation. Thus, the end product after sintering will be a shaped skeletal structure with interconnected porosity that will be interpenetrating in nature. This shaped porous skeletal structure can then be infiltrated with a desired Al-alloy which will wet the alumino-silicate microspheres. The end product is a complex shaped, lightweight, high strength composite.

Case III:

Ceramic microspheres (alumino silicate) having a particle size in the range of 1 to 100 micrometer can be used. However, a typical particle size will be in the range of 30 to 80 micrometer. The ceramic microsphere can be used in binder jet type process. A layer of around 100 microns of the powder can be spread out into a layer using a doctor blade or a counter rotating roller. A binder in solution is deposited on to select areas of the spread out ceramic microsphere layer. On completion of one layer, another layer of the powder is spread out and again the binder in solution is sprayed again. In this manner a 3D structure is build up layer by layer held together by the binder. The shaped green part can be depowdered and then cured in an oven to cross-link the binder making the shaped skeleton stronger. The shaped component is then subjected to thermal debinding to remove the organic binder followed by sintering to form a porous skeletal structure that is interpenetrating in nature. This shaped porous skeletal structure can then be infiltrated with a desired Al-alloy which is expected to wet the alumino-silicate microspheres. The end produce is expected to be a complex shaped, lightweight, high strength composite material.

Case VI:

Ceramic microspheres (alumino silicate) having a particle size in the range of 1 to 100 micrometer can be used. However, a typical particle size will be in the range of 2 to 20 micrometer. For lower strength, lower density, but higher flow, larger particles (50 to 100 micrometers) of microspheres can be used. For higher strength, dense ceramic particles can be used (but will likely need a coating for neck formation). Ceramic microspheres in the desired size range can be mixed with any one of the thermoplastic based organic binders and formed into pellets. These pellets can then be used as the basis for extrusion based freeform fabrication to form complex shaped 3D structures. The organic binders can then be removed through a combination of solvent debinding and thermal debinding followed by sintering. After sintering the powder mass will have an interpenetrating skeletal structure which is expected to be rigid due to the neck formation. The skeletal structure can then be coated with a metallic material such as iron or nickel using a chemical vapor deposition type process. This will result in the formation of a thin layer of a metal deposited on the structure of the alumino-silicate skeletal surface while maintaining the interpenetrating nature of the structure. The ultra-thin metallic layer can totally alter the wetting behavior of the Al-alloy infiltrant. This shaped and metallic coated porous skeletal structure can then be infiltrated with a desired Al-alloy which is expected to wet the coated alumino-silicate microspheres. The end produce is expected to be a complex shaped, lightweight, high strength composite material.

Similar coated structure can be applied to Case II and Case III described above.

Figure 11:
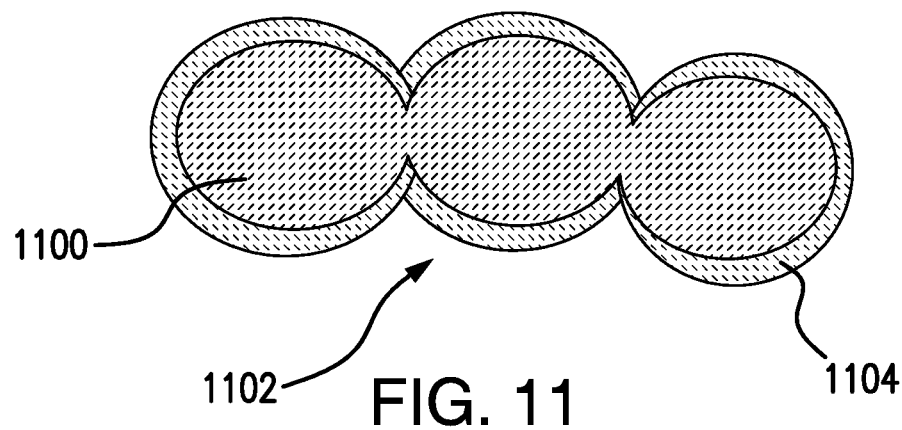
FIG. 11 is a cross-sectional representation of ceramic microspheres forming a porous interconnected skeleton that is subsequently coated with a thin metallic layer.

Case V:

Ceramic microspheres (alumino silicate) having a particle size in the range of 1 to 100 micrometer can be used. However, a typical particle size will be in the range of 2 to 20 micrometer. For lower strength, lower density, but higher flow, larger particles (50 to 100 micrometers) of microspheres can be used. For higher strength, dense ceramic particles can be used (but will likely need a coating for neck formation). Ceramic microspheres in the desired size range can be mixed with a thermoplastic based organic binders and formed into pellets. These pellets can then be used as the basis for extrusion based freeform fabrication to form complex shaped 3D structures. The organic binders can then be removed through a combination of solvent debinding and thermal debinding followed by sintering. After sintering the powder mass will have an interpenetrating skeletal structure which is expected to be rigid due to the neck formation. The skeletal structure can then be coated with a metallic material such as iron or nickel using a chemical vapor deposition type process. This will result in the formation of a thin layer of a metal deposited on the structure of the alumino-silicate skeletal surface while maintaining the interpenetrating nature of the structure. The ultra-thin metallic layer can totally alter the wetting behavior of the Al-alloy infiltrant. This shaped and metallic coated porous skeletal structure can then be infiltrated with a desired Al-alloy which is expected to wet the coated alumino-silicate microspheres. The end produce is expected to be a complex shaped, lightweight, high strength composite material. FIG. 11 shows the schematic of the ceramic microspheres 1100 that have been first printed, debound, sintered and then followed by coating the sintered skeleton 1102 with a thin metallic layer 1104. A similar coated structure can be applied to Case II and Case III described above.

Figure 12:
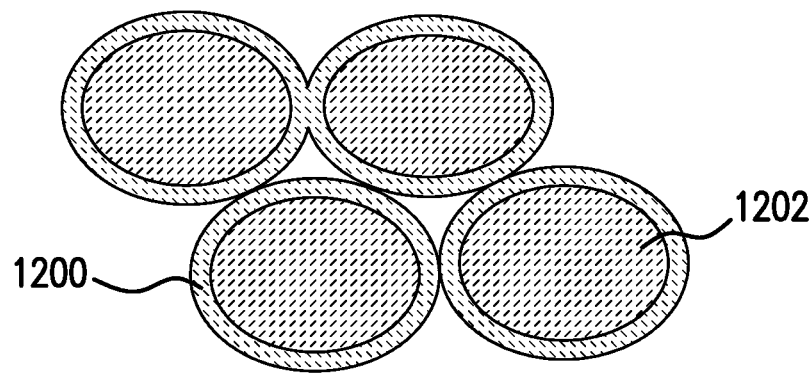
FIG. 12 is a cross-sectional representation of ceramic microspheres coated with thin metallic layer and then formed into a porous interconnected skeleton.
Figure 13:
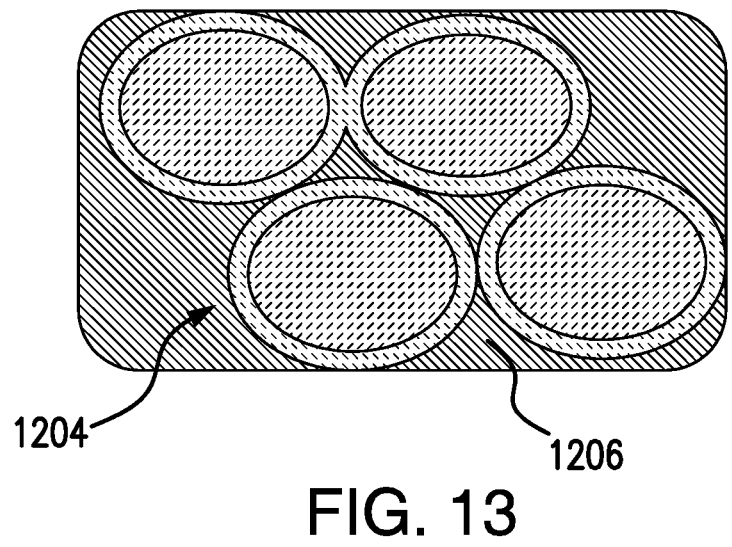
FIG. 13 illustrates the porous interconnected skeleton of FIG. 12 subsequently infiltrated with an infiltrant alloy.

Case V:

Ceramic microspheres (alumino silicate) having a particle size in the range of 1 to 100 micrometer can be used. However, a typical particle size will be in the range of 2 to 20 micrometer. For lower strength, lower density, but higher flow, larger particles (50 to 100 micrometers) of microspheres can be used. For higher strength, dense ceramic particles can be used (but will likely need a coating for neck formation). Ceramic microspheres in the desired size range are first coated with a thin layer of a metallic material using any number of coating approaches. Typical coatings can be nickel, iron, aluminum etc. It is also possible to have the coating of a second metallic material on the first metallic coating. This metallic coated ceramic microsphere can then be mixed with a thermoplastic based organic binders and formed into pellets. These pellets can then be used as the basis for extrusion based freeform fabrication to form complex shaped 3D structures. The organic binders can then be removed through a combination of solvent debinding and thermal debinding followed by sintering. After sintering the powder mass will have an interpenetrating skeletal structure which is expected to be rigid due to the neck formation which in this case will be a neck that will be formed between the metal that goes to form the top coating layer on the ceramic microspheres. This will result in the formation of a thin layer of a metal on the structure of the alumino-silicate skeletal surface while maintaining the interpenetrating nature of the structure. The ultra-thin metallic layer can totally alter the wetting behavior of the Al-alloy infiltrant. This shaped porous skeletal structure can then be infiltrated with a desired Al-alloy which is expected to wet the coated alumino-silicate microspheres. FIG. 12 shows a schematic of a thin metal layer 1200 coating ceramic microspheres 1202 that have been printed, debound, and sintered to form a skeletal structure with interconnected porosity that can be infiltrated with the desired Al-alloy. FIG. 13 shows a schematic of the sintered metal coated microsphere skeletal shape 1204 that is infiltrated with an Al-alloy 1206. The end product is a complex shaped, lightweight, high strength composite.

Similar metallic coated ceramic microsphere based structure can be applied to Case II and Case III described above.

Case VI:

Glass microspheres having a particle size in the range of 1 to 100 micrometer can also be used. However, a typical particle size will be in the range of 5 to 50 micrometer. For lower strength, lower density, but higher flow, larger particles (50 to 100 micrometers) of microspheres can be used. For higher strength, dense glass-ceramic particles can be used (but will likely need a coating for neck formation). Glass microspheres in the desired size range can be first coated with a thin layer of a metallic material using any number of coating approaches. Typical coatings can be nickel, iron, aluminum etc. It is also possible to have the coating of a second metallic material on the first metallic coating. The rest of the steps will be similar to that described in Case V.

Similar metallic coated glass microsphere based structure can be applied to Case II and Case III described above.

According to one aspect, an additive manufacturing method may include spreading layers of a powder across a powder bed, the powder including particles having a first material and a coating of a second material on the first material, the second material including one or more of a metal or a metalloid, and the particles having an average weight ratio of the first material to the second material, binding at least a portion of each layer of the powder in a respective controlled two-dimensional pattern in the powder bed, the two-dimensional patterns in the layers collectively defining a three-dimensional object, and densifying the three-dimensional object into a part having microstructures including the first material and the second material in the predetermined weight ratio.

In certain implementations, the average weight ratio of the particles may be a predetermined weight ratio.

In some implementations, the coating may envelop the first material, and the first material is isolated from an ambient environment as each layer of the powder is spread across the powder bed.

In certain implementations, the first material may have a first melting temperature, the second material has a second melting temperature, and the first melting temperature is greater than the second melting temperature.

In some implementations, the first material may have a first density, and the second material may have a second density different from the first density.

In certain implementations, densifying the three-dimensional object may include forming a liquid phase of at least one of the first material and the second material. For example, one of the first material and the second material may be substantially insoluble in the other one of the first material and the second material. As a more specific example, one of the first material and the second material may include copper. Additionally, or alternatively, the other one of the first material and the second material may include tungsten or molybdenum. The predetermined weight ratio of the first material to the second material may be, for example, greater than about 8 to 1 and less than about 10 to 1. As another example, one of the first material and the second material may be soluble in the other one of the first material and the second material. Continuing with this example, the first material may include tungsten carbide and the second material includes cobalt, and the microstructures include tungsten carbide cobalt.

In some implementations, as the three-dimensional object is densified, the first material and the second material may remain in respective solid phases.

In certain implementations, the first material may have a first coefficient of thermal expansion and the second material may have a second coefficient of thermal expansion different from the first coefficient of thermal expansion. The second coefficient of thermal expansion may be, for example, less than the first coefficient of thermal expansion.

In some implementations, the first material may have a first electrical conductivity and the second material may have a second electrical conductivity different from the first electrical conductivity.

In certain implementations, the microstructures may have an electrical conductivity greater than an electrical conductivity of the first material and a coefficient of thermal expansion less than a coefficient of thermal expansion of the second material.

According to another aspect, an additive manufacturing method may include spreading layers of a powder across a powder bed, the powder including microspheres and a coating on the microspheres, the microspheres formed of a first material defining hollow volumes corresponding to the respective microspheres, binding at least a portion of each layer of the powder in a respective controlled two-dimensional pattern in the powder bed, the two-dimensional patterns in the layers collectively defining a three-dimensional object, and sintering the three-dimensional object to form a part including the first material and the second material.

In certain implementations, the microspheres may have an average particle size of greater than about 20 microns and less than about 80 microns. Additionally, or alternatively, the first material may be a ceramic. Further, or instead, the first material may be aluminum silica.

In some implementations, the microspheres may further include nitrogen in the respective hollow volumes defined by the first material of the microspheres.

According to still another aspect, a powder for additive manufacturing of a three-dimensional object may include microspheres formed of a first material, the first material defining hollow volumes corresponding to the respective microspheres, and a coating of a second material on the first material of the microspheres, wherein the first material is a nonmetallic and inorganic and the second material is a metal.

According to yet another aspect, an additive manufacturing method may include spreading layers of a powder across a powder bed, the powder including particles having a first metal and a coating of a second metal on the first metal, delivering a binder to at least a portion of each layer of the powder in a respective controlled two-dimensional pattern in the powder bed, the two-dimensional patterns in the layers collectively defining a three-dimensional object, and, under the same conditions of exposure to the binder, the first material having a first corrosion rate and the second material having a second corrosion less than the first corrosion rate, and densifying the three-dimensional object into a part.

In certain implementations, the coating may envelop the first metal, and the first metal may be isolated from an ambient environment as each layer of the powder is spread across the powder bed. For example, the ambient environment may be an oxidizing environment of the first metal.

In some implementations, the part may be formed of microstructures including the first metal and the second metal in a weight ratio substantially equal to a weight ratio of the first metal and the second metal in the particles of the powder.

In certain implementations, the binder may be an aqueous binder.

In some implementations, the particles collectively may have a predetermined weight ratio of the first material to the second material.

According to another aspect, an additive manufacturing method may include spreading layers of a powder across a powder bed, the powder including particles having a first metal coated with a second metal, delivering a binder to at least a portion of each layer of the powder in a respective controlled two-dimensional pattern in the powder bed, the two-dimensional patterns in the layers collectively defining a three-dimensional object, and heating the three-dimensional object to a temperature at which the first metal and the second metal in the three-dimensional object react with one another in an exothermic reaction.

In certain implementations, the second metal may have a lower melting point than the first metal.

In some implementations, the first metal may be aluminum and the second metal may be nickel, and the first metal and the second metal react with one another to form nickel aluminide.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

As used herein, melting temperature refers to the temperature where a liquid phase begins to form. Alloy refers to a composition that are predominantly, by weight, the metal preceding alloy, for example a copper alloy is contains more copper than any other metal. Further, a micron is the same as a micrometer.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A dispersible power for three-dimensional additive metal manufacturing, comprising:
    a plurality of granules, each granule including a dispersion of first metallic particles agglomerated in an organic binder matrix;
    wherein the granules are flowable relative to one another, are substantially spherical and have an average particle size of between 20 microns and 100 microns; and
    wherein the first metallic particles are sintered to one another.

2. The dispersible powder of claim 1 wherein the first metallic particles have an average particle size of between 1 micron and 5 microns.

3. The dispersible powder of claim 1 wherein the first metallic particles have an average particle size of between 1 nanometer and 100 nanometers.

4. The dispersible powder of claim 1 wherein the first metallic particles are selected to be one or more of tungsten, copper, nickel, cobalt, iron, tin, silver and aluminum, as well as ceramics, alloys, mixtures, carbides and composites thereof.

5. The dispersible powder of claim 4 wherein the first metallic particles include a mixture of tungsten carbide and cobalt.

6. The dispersible powder of claim 1 wherein the organic binder matrix is soluble in a solvent.

7. The dispersible powder of claim 6 wherein the solvent is selected from the group consisting of water, hexane, heptane, acetone, perchloroethylene (PERC), alcohol and limonene.

8. The dispersible powder of claim 1 wherein the melt temperature of the organic binder matrix is less than the melt temperature of the first metallic particles.

9. The dispersible powder of claim 6 wherein the organic binder matrix is formed from a polymer selected from the group consisting of polyethylene glycol, polyethylene, polylactic acid, polyacrylic acid, polypropylene and combinations thereof.

10. The dispersible powder of claim 1 wherein a plurality of second metallic particles are mixed with the granules in a flowable mixture.

11. The dispersible powder of claim 10 wherein the organic binder matrix is effective to bind the first metallic particles and the second metallic particles.

12. The dispersible powder of claim 10 wherein the granules and the second metallic particles form a bimodal powder distribution.

13. The dispersible powder of claim 10 wherein a composition of the second metallic particles differs from the composition of the first metallic particles.

14. The dispersible powder of claim 13 wherein the hardness of the second metallic particles differs from the hardness of the first metallic particles.

15. The dispersible powder of claim 13 wherein first metallic particles do not alloy with the second metallic particles.

16. The dispersible powder of claim 15 wherein the first metallic particles are copper or a copper-base alloy and the second metallic particles are selected from the group consisting of tungsten, molybdenum, alloys thereof and mixtures thereof.

* * * * *